US007225233B1

(12) United States Patent
Fenton

(10) Patent No.: US 7,225,233 B1
(45) Date of Patent: May 29, 2007

(54) SYSTEM AND METHOD FOR INTERACTIVE, MULTIMEDIA ENTERTAINMENT, EDUCATION OR OTHER EXPERIENCE, AND REVENUE GENERATION THEREFROM

(76) Inventor: James R. Fenton, 300 33rd St., Manhattan Beach, CA (US) 90266

( * ) Notice: Subject to any disclaimer, the term of this patent is extended or adjusted under 35 U.S.C. 154(b) by 606 days.

(21) Appl. No.: 09/677,936

(22) Filed: Oct. 3, 2000

(51) Int. Cl.
*G06F 15/16* (2006.01)

(52) U.S. Cl. ..................... 709/207; 709/206

(58) Field of Classification Search ............... 709/204, 709/206, 205, 201, 202, 203, 207, 217, 227; 706/46, 11; 463/42; 707/8; 705/35; 345/473
See application file for complete search history.

(56) References Cited

U.S. PATENT DOCUMENTS

| | | | |
|---|---|---|---|
| 4,846,693 A | 7/1989 | Baer | |
| 5,108,115 A | 4/1992 | Berman et al. | |
| 5,676,551 A | 10/1997 | Knight et al. | |
| 5,695,400 A | 12/1997 | Fennell, Jr. et al. | |
| 5,766,076 A | 6/1998 | Pease et al. | |
| 5,779,549 A | 7/1998 | Walker et al. | |
| 5,805,784 A | 9/1998 | Crawford | |
| 5,872,927 A * | 2/1999 | Shiels et al. | 709/206 |
| 5,890,963 A | 4/1999 | Yen | |
| 5,892,507 A * | 4/1999 | Moorby et al. | 715/500.1 |
| 5,894,320 A | 4/1999 | Vancelette | |
| 5,999,172 A * | 12/1999 | Roach | 715/500.1 |
| 6,088,719 A * | 7/2000 | Murakami | 709/204 |
| 6,119,147 A * | 9/2000 | Toomey et al. | 709/204 |
| 6,349,290 B1 * | 2/2002 | Horowitz et al. | 705/35 |
| 6,371,855 B1 * | 4/2002 | Gavriloff | 463/42 |
| 6,504,990 B1 * | 1/2003 | Abecassis | 386/46 |
| 6,535,878 B1 * | 3/2003 | Guedalia et al. | 707/8 |
| 6,570,555 B1 * | 5/2003 | Prevost et al. | 345/156 |
| 6,611,822 B1 * | 8/2003 | Beams et al. | 706/11 |
| 6,763,342 B1 * | 7/2004 | Mattern et al. | 706/46 |
| 6,954,902 B2 * | 10/2005 | Noma et al. | 715/753 |
| 2001/0019330 A1 * | 9/2001 | Bickmore et al. | 345/473 |
| 2001/0041053 A1 * | 11/2001 | Abecassis | 386/83 |

* cited by examiner

*Primary Examiner*—Paul H. Kang
(74) *Attorney, Agent, or Firm*—Jones Day

(57) ABSTRACT

A system and method provide a story line with which a participant may interact using various forms of media. Mechanisms to generate revenue in connection with the participating with the story line are also provided.

29 Claims, 40 Drawing Sheets

FIG. 6

From: DareToPlay.com
Sent: Day, Date, Time
To: Participant's Name
Subject: Let The Experience Begin...     502

Dear [Participant's Name],

This email is to notify you that you have a message on your on-line answering machine that needs to be checked.

Please go to:     504

> http://www.daretoplay.com/audiomessages/participan_tname.htm to check it.

Also, please bookmark this URL so you can periodically check your messages in the future.

This will be the only time you will be informed via email that you have messages.

FIG. 7a
[Participant's Name] Answering Machine
You have one new message.
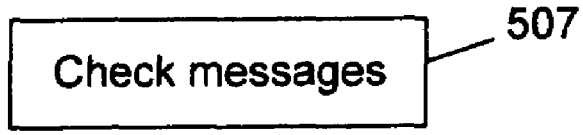
Check messages — 507
Please delete messages after you have listened to them.
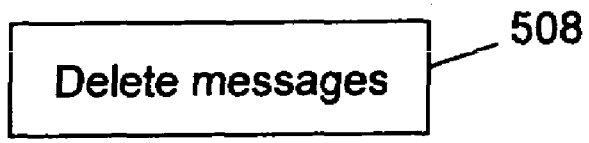
Delete messages — 508
If you do not have speakers, click here to get message text. You do not need to delete the messages if you choose this option.
Get text messages — 510

FIG. 7b

[Participant's Name] Answering Machine

You have one new message.

New Message

Hello Mr. or Ms. [Participant's Name],

This is the office of Mr. Henry Davidson calling. Please be advised that you will receive an urgent email message today that requires your immediate attention. If you do not receive it, please give us a call. Thank you.

From: Henry Davidson
Sent: Day, Date, Time
To: Participant's Name
Subject: Inheritance 512 

Dear Mr. [Participant's Name],

This notice is to inform you that you have been named in an inheritance award from an anonymous benefactor. The conditions of the award are that you receive the sum of one million dollars after you carry out the actions specified in the will.

You were chosen by the benefactor because of your reputation as a private detective. You will receive the information regarding what is required of you within the next several days.

Do not, under any circumstances, speak of this to anyone as the information you are about to receive is highly confidential, as well as potentially very dangerous, should the wrong people find out you are involved.

This is a very serious matter I assure you. Again, speak to no one.

Sincerely,

Mr. Henry J. Davidson
Attorney at Law

FIG. 9a

From: Charlie Ward
Sent: Day, Date, Time
To: Participant's Name
Subject: Peterson; Let's Party

518

Hey [Participant's Name],

Haven't talked with you in a little while and thought I would drop you a note. Word on the street is that old man Peterson passed away not on the best of terms with the company, if you know what I mean. Word is that he's trying to cause some trouble from the grave and the boys aren't too happy about it -- they're hitting the street pretty hard to find out what the old man is up to.

I know you had a case that dealt with him a number of years ago, and just wanted to warn you that your name might come up. I'd recommend that if it does, you lay low and stay out of it. My gut feeling is that Peterson has something that the boys don't want known public.

Hey, I just had a great idea. Why don't you meet me out tonight? I'm entertaining a couple of fine young ladies, and need someone to help me out. What do you say? Let's meet at Bar Fly at around ten tonight -- I'll put you on the list to get in. I guarantee it will be worth your while. I'd also like to talk to you more about the Peterson thing, I have some info you might find interesting.

Tonight then,

Later,
Chalie

For a bio of Charlie, click here: 520 http://www.daretoplay.com/chalie_bio.htm

Decision Time: ← 524     524a

Your choices are:

A. You meet Sally tonight and she seduces you. You make love to her all night long. While you are there you also find out some interesting information. However, you may have been seen but you do not know for sure.

B. You don not meet Sally tonight. The risk is too high. Instead, you decide to meet Charlie and his two ladies at Bar Fly. He has some interesting information for you, not to mention his beautiful companions, one of which is clearly hot for you. She seduces you and you end up partying late into the night.

524b

To make you decision, click here:

http://www.daretoplay.com/participant_name/decision1.htm — 526

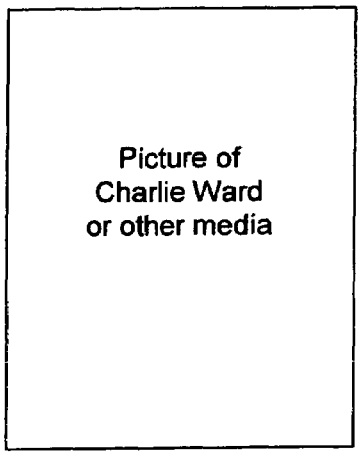

Picture of Charlie Ward or other media

Charlie Ward

Charlie Ward is an old friend of yours that also servers as an excellent informant for you when you need to know the word on the street.

He is also quite the lady's man, and is a regular on the Los Angeles social scene. He's a VIP at all the Hollywood hot spots and his connections never cease to amaze you.

The ladies love Charlie, and when he has set you up with them in the past, they have been beautiful and ready to party.

Charlie has always been a loyal friend that you trust, although sometimes you don't quite trust his judgment.

Time to Make a Decision...

Make a decision and begin your adventure. Below are your choices...

A. You meet Sally tonight and she seduces you. You make love to her all night long. While you are there, you also find out some interesting information. However, you do not know if you were seen by anyone else or not.

To choose this decision and find out what happens in full detail | Click Here | 524aa B. You do not meet Sally tonight. The risk is too high. Instead, you decide to meet with Charlie and his two ladies at the Sky Bar. He has some interesting information for you, not to mention his companions, one of which is clearly hot for you. You get lucky with one of them and end up partying late into the night.

To choose this decision and find out what happens in full detail | Click Here | 524bb

FIG. 9d

You Meet Charlie and His Two Ladies

524bb

[Picture of Charlie Ward and his two lady friends or other media]

[Additional picture or other media conveying evening's events]

[Additional picture or other media conveying evening's events]

Instead of meeting Sally Peterson, you decide it is safer at this point to meet up with your friend and informant Charlie. Besides, he promised you a good time with some girls and he has never let you down in the past.

You arrive at one of the new hot bars in town, the Sky Bar, just after 10:00PM, as Charlie asked, but at the entrance to the bar, there is a huge line to get in. Hoping that Charlie arranged something for you, you ask the doorman to check for your name on the VIP guest list. Sure enough, you slip right into the crowded night club.

In the back of the bar, you find Charlie at a nice large table, a beautiful blonde on each arm. "Good choice," you say to yourself.

"Hey [Participant's Name], my man, excellent to see you. Let me introduce you to a couple of my friends, Lisa and Sherry." The girls smile and you shake their hands gently. Charlie gives you a bear hug and motions to the waitress for a round of cocktails, ordering you a nice cold beer.

The evening proves to be a wild night out, and Sherry wants you to take her home. Charlie always comes through.

Later on, you and Charlie talk about how fun the night was and soon you're talking about old times. He tells you that he has heard your name come up in conversations regarding the late Phillip Peterson, and warns you again to stay out of it. The only concrete piece of information he has is that Peterson's lawyer, Henry Davidson, was loyal to Peterson and very trustworthy. He might be able to help you out if you find yourself involved...

It's late, you're tired, and you kiss Sherry goodnight. She gives you her number and makes a date with you.

FIG. 10a

From: Henry Davidson
Sent: Day, Date, Time
To: Participant's Name       532
Subject: Information for you Dear Mr. [Participant' name], I would like you to pick up some information you will need to comply with Mr. Peterson's will.

The information has been placed in a briefcase for you. The briefcase has been placed in locker #107 located in Gate 3 of the Los Angeles International Airport. The key to the locker has been placed in your mail box, please retrieve it immediately.

This information is for your eyes only and must be treated as highly confidential. Please make sure no one is following you when you pick it up. I do not believe anyone knows you are involved or that the briefcase has been placed in the airport locker.

When you retrieve the case, I will be in touch with you to give you the conbination you will need to open it.

Sincerely,

Mr. Henry J. Davidson

Time for some action:        534

Mandatory: To retrieve the briefcase, click on the link below. Be advised, there is some risk involved and you may see a little action you're not expecting.

http://www.daretoplay.com/participant_name/action1.htm — 536

Get the Briefcase

Just as Mr. Davidson promised, you find the key to the airport locker lying in your mailbox. Within twenty minutes you are parking your car at the airport, constantly checking your rear view mirror.

[Picture of airport or other media]

As you walk down the corridor towards Gate 3, your heart is pounding. You don't think anyone is behind you, but you can't help but think that they might be waiting for you at the locker. As you approach the lockers, you decide to take a seat for a while and survey the situation before opening the locker. Several seats away from you to the right is a young business man who ignores you. To your left is an older woman sitting next to a middle aged dark-haired man having a quiet conversation. They both seem to notice you, but continue their conversation.

[Picture of scene near locker or other media]

[Picture of men following participant or other media]

After a few minutes you decide it's now or never, so you approach locker 107 with key in hand. You open the locker and grab the briefcase. As you turn, you notice the young businessman standing, looking at you. You also notice several other young business men walking briskly towards you from your right. You immediately begin to walk down the corridor to the left, looking behind you to see if they are following you. There are now four men walking directly behind you.

[Picture of participant driving away or other media]

You decide to run. Ahead of you is baggage claim and a large crowd, a perfect opportunity to make a move. You run towards the center of the crowd where the circular baggage conveyer belt is delivering all sorts of suitcases and packages, large and small. Never taking your eyes off the bags, you circle the delivery area, weaving through the crowd. Finally, you see what you are looking for: another briefcase on the conveyer belt. The four men are searching the crowd. Before they see you, you place your briefcase on the conveyer belt under a large suitcase, grab the other briefcase and head in the direction of the four men. They surround you.

"I think you know what we want, [Participant's Name]. Give us the briefcases and we'll let you go," one of them says. You hand it to them, and they disappear out into the loading area.

You head back to baggage claim, grab the real briefcase, and head back to your car. Completely unnoticed.

FIG. 11

554

From: Charlie Ward
Sent: Day, Date, Time
To: Participant's Name
Subject: Good time last night Hey [Participant's Name], we sure did it up last night, eh? The girls had a blast. I knew Sherry would love you man. We'll have to do it again sometime real soon.

By the way, I have a little advice for you. Watch out for Peterson's daughter, Sally. I've never met her myself, but the word is she's poking her nose into her father's business, rustling a few feathers along the way. She's digging pretty hard so I have a feeling she may try to contact you and everyone else that knew her dear old dad. I hear she's a total hotty, but I also hear she uses people to get want she wants. I don't know what's going on with this whole thing, but just watch yourself.

Just a little advice,

I have some business to take care of tonight in Beverly Hills, but I'll be in contact soon.

Take it easy buddy,
Charlie

FIG. 12a

From: Henry Davidson
Sent: Day, Date, Time
To: Participant's Name
Subject: Heard you had a little trouble

556

Dear Mr. [Participant's Name],

I understand you had a little trouble retrieving the briefcase from the airport locker, but that you were ultimately successful. From what I hear, you were quite crafty.

I am sorry about the tight position you were put in. I do not know how the location of the briefcase leaked out, but I fear that someone working for me may have doublecrossed us. From here on out we must be extra cautious. This is very serious business.

For your protection, now that they know you are involved and that you have the briefcase, I recommend you leave your home immediately and check into a hotel. I would like to lend you my assistance with this. I have reserved you a room at the Hermosa Hotel and have paid the account on an open credit card. Please make sure no one follows you there.

The combination to the briefcase is in an envelop placed in your mailbox at the hotel. I will be in contact with you soon to fill in the gaps as some of the documents are difficult to piece together.

Gook luck.

Sincerely,
Mr. Henry J. Davidson

Decision time: ← 558

558a

Your choices are:

A. You immediately pack a bag, grab the briefcase and head for the Hermosa Hotel. After the airport incident, you are not sure you can trust anyone, but you hope you can trust Davidson. Although this may be a set up, you feel you have no other choice at this point. You go to the hotel to open the briefcase. You just hope no one is there waiting for you.

B. At this point you don't trust anyone. You break open the briefcase using a hammer and screwdriver in order to finally see the documents. However, the longer you stay at your house, the more danger you may be in. In fact, it may already be too late.

To make your decision, go to:

http://www.daretoplay.com/participant_name/decision2.htm ── 560    558b

Time to Make a Decision...

Make a decision and continue your adventure. Below are your choices...

A. You immediately pack a bag, grab the briefcase and head for the Hermosa Hotel. After the airport experience, you are not sure you can trust anyone, but you hope you can trust Davidson. Although this may be a set up, you feel you have no other choice at this point. You go to the hotel to open the briefcase. You just hope no one is there waiting for you.

To choose this decision and find out what happens in full detail [ Click Here ] 558aa B. At this point, you don't trust anyone. You break open the briefcase using a hammer and screwdriver in order to finally see the documents. However, the longer you stay at your house, the more danger you may be in. In fact, it may already be too late.

To choose this decision and find out what happens in full detail [ Click Here ] 558bb

FIG. 12c

Head for the Hermosa Hotel and Open the Briefcase

After you get the Davidson message and instructions, you decide to take his advice and get out of your house. The airport experience left you unsure that you can trust anyone – still you hope you can trust Davidson. Even though it might be a set-up, you decide to head for the Hermosa Hotel. You quickly pack an overnight bag, grab the briefcase and leave your house.

When you arrive at the hotel, you self park the car and survey the situation. As you enter the lobby, you don't see anything suspicious, but you decide to casually take a look around. You circle the lobby, poke your head into the bar and restaurant, but the place seems very quiet. At this point, you step up the the check-in counter.

"May I help you?" asks the front desk attendant.

"Yes, thank you, I need to check in. The name is [Participant's Name]."

I have one of our suites for you," he says, "and here is an envelope that was waiting for you."

[Picture of hotel or other media]

You take the envelope and the room key and casually slip into the back booth of the hotel lounge. You order an ice-cold beer. You figure to open the briefcase there, just in case someone is waiting for you upstairs.

With the combination, the briefcase opens easily. As you leaf through the documents, letters, depositions and transcribed interviews, you begin to understand why so many people are interested. It appears that several years ago, Peterson's business, acting as a front for an organized crime family, was heavily involved in some shady dealings with a South American export company. Several of the documents speak more clearly – Columbian drugs. There is also a newspaper clipping of a small plane crashing off the coast of California coming from Columbia, no survivors. Among the list of dead were several top officials of the export company, some of Peterson's top men and Peterson's daughter, Clarice, from his first marriage. The article also mentions that Clarice was a last-minute passenger who was not schedule to leave from the family vacation until later, but at the last minute decided to get home early. The cause of the crash was never determined.

[Picture of quiet bar lounge or other media]

Still cautious, you decide to check the briefcase with the hotel clerk, and head up to your suite empty-handed. When you enter, turn on the light, you realize you are not alone.

"So we meet again, eh [Participant's Name]?" – it's one of the men from the airport. "Where's the briefcase?"

FIG. 14

Media Messaging Logo

Welcome to the #1 Multimedia Messaging Site on the Web

- Email / Picture Email
- On-Line Voice Mail
- Video Conferencing
- Instant Messaging
- Chat
- Multimedia Presentations
- And Much More "MediaMessaging.com is the future of today's media rich digital messaging."

— Internet Chronicles

Sign-In Name:

[          ] @mediamessaging.com

Password:

[          ]   Submit | Reset

☐ New Events:

- Welcome DareToPlay.com Customers!

- New Business-To-Business Packages Available

- Participate in Live Netcast events on topics of your interest including Sports, Business and much more

- You now have unlimited storage space for your multimedia messages at no extra charge

FIG. 15a

The Los Angeles
Investigative Reporter

520a

Home  Archives  Home Delivery  Subscriptions  Print Edition  Discussions  Site Map  Help Members Sign In:

[       ] Subscriber ID

[       ] Password

Submit | Reset

Breaking News:

National
    International
    Local
    Politics
    Commentary

Calendar:

Music
    Movies
    Art
    Theater
    TV
    Restaurants
    Books

Business:

Technology
    Small Business
    Stocks and Markets
    Personal Finance
    Real Estate

Sports:

Stories
    Scores
    Schedules
    Columnists

Classifieds:

Homes
    Cars
    Jobs
    Rentals
    Electronics
    Auctions

Today's Headlines:

Headline #1:

[Headline and short synopsis of story.]

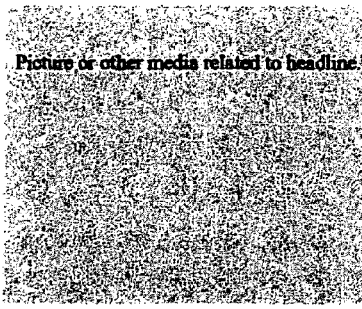

Headline #2:

[Headline and short synopsis of story.]

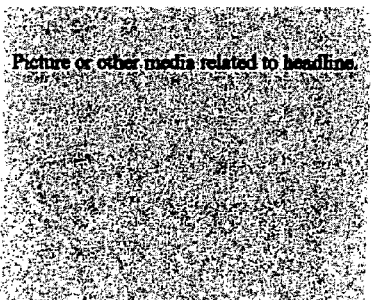

Headline #3:

[Headline and short synopsis of story.]

The Los Angeles
Investigative Reporter

Home  Archives  Home Delivery  Subscriptions  Print Edition  Discussions  Site Map  Help

---

We're sorry, but either your *Subscriber ID* and *Password* were entered incorrectly, or you have accessed a page that first requires you to log-in.

Please return to our Home page and enter your *Subscriber ID* and *Password*.

Thank you.

The Los Angeles
Investigative Reporter

Home  Archives  Home Delivery  Subscriptions  Print Edition  Discussions  Site Map  Help

---

Cold Case Warms Up ← 520c

June 15, 1999

Cold cases are what Charlie Smith knows something about. A descendent of the Smith dynasty in criminal investigation, he specializes in today's world of unsolved robberies.

"The whole world of cold cases opened up with the advent of computers," says Charlie, while pecking away at his laptop.

"Forensic science, which deals more and more with DNA information gathered on the world's databases makes it possible to find out who did what way back when. Usually, the focus is on homicide cases due to the large amount of material evidence gathered at the crime scene. But I've been having some success in plain old cases of stolen money."

And that's just what Charlie has done in a case that baffled a precinct of the New York Police Department more than seven years ago.

"It was literally a cold and stormy night when they pulled off this job, and that's partly why they got away with it."

The job to which he refers is the famous armored car Heist of January 11, 1993 that occurred at approximately 10:30 PM in a small, dark corner of the East Village. By 11:45 that night, detectives with the NYPD and agents with the FBI all knew the where, the when and certainly the what -- $14 million in gold bouillon. What they didn't know was the "who."

"And we never knew until now."

Fortunate for Charlie Smith, some savvy, perhaps fussy administration officer kept the only evidence they found -- a piece of tissue paper with a tiny spot of blood. Now, a decade later, Charlie was able to run a test on it to find the identity of the person who pulled off one of the biggest robberies in U.S. history.

"We got lucky because we had a match with some other blood sample in the NYPD archives."

It matched with Larry Buxton, a Gulf war hero who had a few run-in's with the law in the days following his duty with the military.

"With Buxton's name, then we were able to uncover who his accomplice was. [Participant's Name], a fellow war hero had had such a close tie with Buxton, that law enforcement officers of the time thought the two men were twins."

At the time, it was thought that the mob was involved with the case, and they still might have been. But evidence now concludes that it was Buxton and [Participant's Name] that made off with the millions.

"Now comes the tricky part. Now is when we see if we can track down the suspects."

Can they?

"Unlikely," says Charlie. So much time has passed and the men were so efficient in their cover-up that he suspects they were as efficient in maintaining non-personas for the rest of their lives. And with the likelihood that they double-crossed two major crime bosses of the day, the impetus to "disappear" is even stronger.

"I might just find them. Stranger things have surely happened. People find needles in haystacks all the time. Even ancient needles."

FIG. 16b

First Boston
ON-LINE

Home  Today's Market  Quotes  Research  Trading  Portfolios  Customer Service

You are attempting to access a page that first requires you to log-in. Or, if you are attempting to log in, your *Customer ID* and *Password* may have been entered incorrectly.

Please return to our home page and enter your *Customer ID* and *Password*.

Thank you.

530b

System response times may vary due to a variety of factors, including trading volumes, market conditions, and system performance.

FIG. 16c

First Boston
ON-LINE

Home  Today's Market  Quotes  Research  Trading  Portfolios  Customer Service

Account Number: 1223BUX

Type of Account: Joint

Account Principles: Larry Buxton, #session.fname# #session.lname#

530c 

Account Portfolio:

| Company | Symbol | Holdings | | Market Price $ | Total Change | | $ Gain/Loss | $ Market Value |
| | | Qty | Paid | | $ | % | | |
|---|---|---|---|---|---|---|---|---|
| Amazon.com | AMZN | 39500 | 50 | 86 9/16 | 36 9/16 | 73.13 | 1,444,219 | 3,419,219 |
| America Online | AOL | 45000 | 38 | 78 3/8 | 40 3/8 | 106.25 | 1,816,875 | 3,526,875 |
| Ancor Comm. | ANCR | 22000 | 26 | 59 7/8 | 33 7/8 | 130.29 | 745,250 | 1,317,250 |
| IBM | IBM | 35000 | 44 | 111 7/8 | 67 7/8 | 154.26 | 2,375,625 | 3,915,625 |
| Intel | INTC | 21000 | 18 | 78 11/16 | 60 11/16 | 337.15 | 1,274,438 | 1,652,438 |
| Microsoft | MSFT | 32000 | 38 | 96 1/8 | 58 1/8 | 152.96 | 1,860,000 | 3,076,000 |
| Qualcom | QCOM | 39000 | 96 | 384 7/16 | 288 7/16 | 300.46 | 11,249,063 | 14,993,063 |
| RF Micro Devices | RFMD | 23500 | 12 | 64 5/8 | 52 5/8 | 438.54 | 1,236,688 | 1,518,688 |
| Yahoo! | YHOO | 40000 | 78 | 253 | 175 | 224.36 | 7,000,000 | 10,120,000 |

Total Portfolio Value $43,539,156

All quotes subject to 20 minute delay.

System response times may vary due to a variety of factors, including trading volumes, market conditions, and system performance.

Copyright © 1999 First Boston On-Line, Inc. All rights reserved.

| webmsgID | userID | msgID | used |
|---|---|---|---|
| 37 | 1 | 146 | Yes |
| 38 | 6 | 6 | Yes |

| mailID | userID | MsgID | msgsubj | msgsender | msgtime | read | readtime |
|---|---|---|---|---|---|---|---|
| 146 | 2 | 8 | Incorrect Log-in Name | The Game | 12/19/99 10:03:23 | No | |
| 311 | 4 | 1 | Welcome to Detailmail! | DetailMail | 4/11/00 12:22:45 PM | No | |
| 316 | 5 | 1 | Welcome to DetailMail! | DetailMail | 4/12/00 1:02:33 PM | No | |
| 509 | 1 | 186 | Crime Ring Article | jgugine@cia | 6/5/00 9:07:26 PM | Yes | 6/5/00 9:12:51 PM |
| 510 | 1 | 1 | Welcome to DetailMail! | DetailMail | 6/14/00 7:52:52 AM | No | |
| 511 | 3 | 1 | Welcome to DetailMail! | DetailMail | 6/15/00 2:26:32 PM | No | |
| 514 | 6 | 4 | Come Watch Us!!! | Suzy@hottime | 6/15/00 2:27:44 PM | Yes | 6/5/00 2:27:43 PM |
| 515 | 6 | 6 | Are You Ready? | DTP | 6/15/00 2:27:44 PM | Yes | 6/5/00 2:29:20 PM |
| 516 | 6 | 10 | Slight Delay | DTP | 6/15/00 2:27:44 PM | Yes | 6/5/00 2:32:50 PM |
| 517 | 6 | 12 | No More Work | A Friend | 6/15/00 2:27:44 PM | Yes | 6/5/00 2:33:44 PM |
| 518 | 6 | 14 | Are you who I think | larrybux@cent | 6/15/00 2:33:32 PM | Yes | 6/5/00 2:35:10 PM |
| 519 | 6 | 13 | Apologize for the Delay | DTP | 6/15/00 2:33:32 PM | No | |

FIG. 21

| msgID | wait | voice | msgsubj | msgsender | attachments | nextpos0 | replynos | nextpos1 | reply1 | nextpos2 | reply2 | nextpos3 | reply3 | Noreply pos | Noreply time |
|---|---|---|---|---|---|---|---|---|---|---|---|---|---|---|---|
| 1 | 0 | No | Welcome | DetailMail | | 4 | 0 | | | | | | | 4 | 5 |
| 2 | 0 | No | Earn BIG | Jman@acere | | 1 | 0 | | | | | | | | |
| 3 | 0 | No | Blank | Blank | | 1 | 0 | | | | | | | | |
| 4 | 0 | No | Come | Suzy@hotti | | 6 | 0 | | | | | | | | |
| 5 | 0 | No | Powerful | Slim555_99 | | 1 | 0 | | | | | | | | |
| 6 | 0 | No | Are You | customerser | | 0 | 0 | | | | | | | 8 | 5 |
| 7 | 0 | No | Blank | Blank | | 1 | 0 | | | | | | | | |
| 8 | 0 | No | You have | customerser | | 0 | 0 | | | | | | | | |
| 9 | 0 | No | Good | ghi@claudia | | 1 | 0 | | | | | | | | |
| 10 | 0 | No | Slight | customerser | | 14 | 0 | | | | | | | | |
| 11 | 0 | No | Get a Low | FREE- | | 1 | 0 | | | | | | | | |
| 12 | 0 | No | No More | A Friend | | 1 | 0 | | | | | | | | |
| 13 | 0 | No | Apligize | customerser | | 1 | 0 | | | | | | | | |
| 14 | 0 | No | Are you | larrybux@c | | 16 | 2 | 22 | yes | 18 | no | | | 15 | 5 |
| 15 | 0 | No | Haven't | larrybux@c | | 16 | 2 | 22 | yes | 18 | no | | | | |
| 16 | 0 | No | re: Are you | larrybux@c | | 20 | 2 | 22 | yes | 18 | no | | | 20 | 5 |
| 17 | 0 | No | Bought a | bikinigirl@b | | 1 | 0 | | | | | | | | |
| 18 | 0 | No | re: Are you | larrybux@c | | 20 | 2 | 22 | yes | 20 | no | | | 20 | 5 |
| 19 | 0 | No | Claim Your | FASTBUCK | | 1 | 0 | | | | | | | | |
| 20 | 0 | No | re: Are you | larrybux@c | | 28 | 2 | 24 | yes | 26 | no | | | 21 | 5 |
| 21 | 0 | No | It's Larry | larrybux@c | | 28 | 2 | 24 | yes | 26 | no | | | | |
| 22 | 0 | No | I finally | larrybux@c | | 28 | 2 | 24 | yes | 26 | no | | | 21 | 5 |
| 23 | 0 | No | INCREAS | Peter82203 | | 1 | 0 | | | | | | | | |
| 24 | 0 | No | You need | larrybux@c | | 36 | 2 | 34 | yes | 32 | no | | | 25 | 5 |
| 25 | 0 | No | Need the | larrybux@c | | 36 | 2 | 34 | yes | 32 | no | | | 40 | 5 |

| 1004a | 1004b | 1004c | 1004d | 1004e | 1004f | 1004g | 1004h | 1004i | 1004j | 1004k | 1004l | 1004m | 1004n | 1004o | 1004p |

FIG. 22

| posID | currmsgs |
|---|---|
| 1 | 1 |
| 2 | 2,3 |
| 3 | 3 |
| 4 | 4,5 |
| 5 | 5 |
| 6 | 6 |
| 7 | 7 |
| 8 | 8 |

FIG. 23

| replyID | userID | MsgID | replytime | msgbody |
|---|---|---|---|---|
| 86 | 6 | 14 | 5/25/00 12:21:58 PM | Yes |
| 87 | 6 | 22 | 5/25/00 12:22:24 PM | Yes |
| 88 | 6 | 24 | 5/25/00 12:22:51 PM | No |
| 96 | 3 | 212 | 6/3/00 10:00:41 PM | briefs |

| userID | username | password | position | logtime | lastname | firstname | middlename |
|---|---|---|---|---|---|---|---|
| 1 | Tino | b | 1 | 6/14/00 7:52:51 AM | Scheder | Constantin | Andreas |
| 2 | Nadja | t | 8 | 6/14/00 7:52:52 AM | Blue | Nadja | |
| 3 | Randy | lucile | 1 | 6/14/00 7:52:51 AM | Fenton | Randy | |
| 4 | randytest | lucile | 1 | 6/14/00 7:52:51 AM | lastnamete | firstnamete | middlename |
| 5 | JB | game | 1 | 6/14/00 7:52:51 AM | Foster | Jonathan | Burgess |
| 6 | Jonathan | foster | 14 | 6/15/00 2:33:44 PM | Foster | Jonathan | Woowoo |

| birthday | address | city | state | region | zipcode | homephone | email |
|---|---|---|---|---|---|---|---|
| 11/18/74 | 8435 Avenida | La Jolla | California | | 92037- | (619) 379-5231 | tinschel@yahoo.com |
| 12/25/197 | 8435 Avenida | La Jolla | California | | 92037- | (858) 459-7353 | nblue1@san.rr.com |
| 11/11/191 | 300 33rd Street | Manhattan | California | | 90266- | (310) 545-0968 | rfenton@networkmed |
| 05/05/196 | street address | citytest | California | namerica | 90266- | (310) 545-0968 | randytest@networkm |
| 6/15/196 | 1647 Selby | Los | California | namerica | 90024- | (310) 470-7016 | jonathanf@longbowfil |
| 6/15/196 | 1647 Selby | Los | California | namerica | 90024- | (310) 470-7016 | jbfoster1@yahoo.co |

FIG. 25

| pageID | pagename | password | wait | nextpos | req_webmsgs | url | nexturl | failurl |
|---|---|---|---|---|---|---|---|---|
| 1 | E-Stock | brinks | 0 | 70 | 58,60,62,64 | stock1.htm | | stock2.htm |
| 2 | LA Register | Cold-case-7-99 | 0 | 44 | 32,34,36,40 | news1.htm | | news2.htm |
| 3 | Swiss Bank #1 | INTACCT5514 | 0 | 150 | 146,148 | swissbank3.ht | swissbank5.ht | swissbank2.ht |
| 4 | Swiss Bank #2 | ACCT5514-T4 | 0 | 220 | 208 | swissbank3.ht | swissbank5.ht | swissbank2.ht |
| 5 | DTP | | 0 | 10 | 6,8 | disclaimer1.ht | | disclaimer2.ht |

FIG. 26

| | Script Name | Function | Remarks |
|---|---|---|---|
| 1102 | application.cfm | Initialization of certain variables for cold fusion | |
| 1104 | authentifail.cfm | Warning message when participant's authentification fails | |
| 1106 | delete.cfm | Deletes message out of the participant's mailbox | |
| 1108 | mailserver.cfm | Distributes messages to participants | Preferably called in the background at short intervals |
| 1110 | msgretrieve.cfm | Displays mailbox of participant | |
| 1112 | posretrieve.cfm | Retrieves next position for participant | |
| 1114 | reply.cfm | Creates form when participant replies to message | |
| 1116 | sendreply.cfm | Handles participant's reply | Retrieves next position, stores reply in database, ... |
| 1118 | showmsg.cfm | Displays message text / voicemail | |
| 1120 | start.htm | Login page for the participant | |

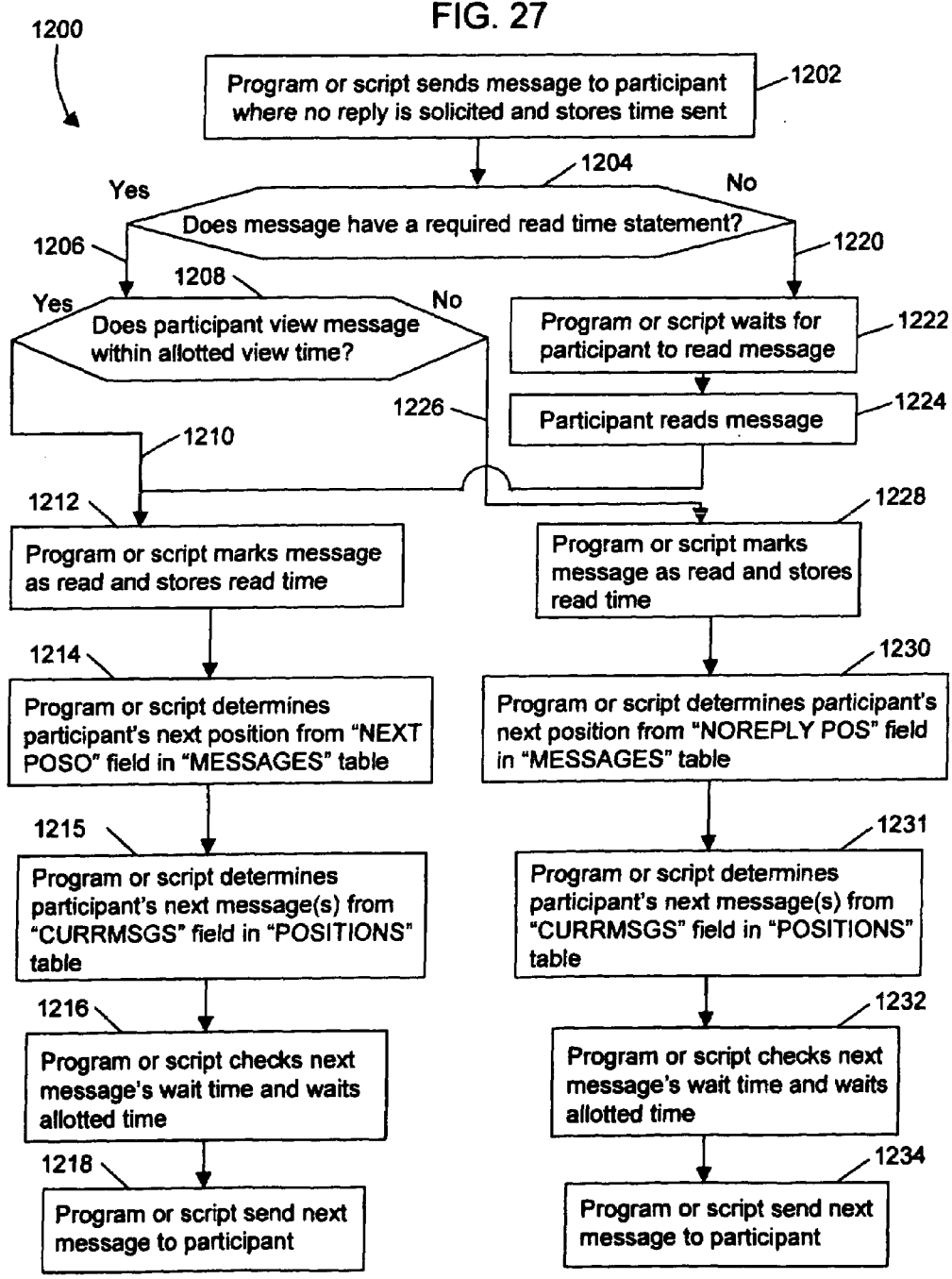

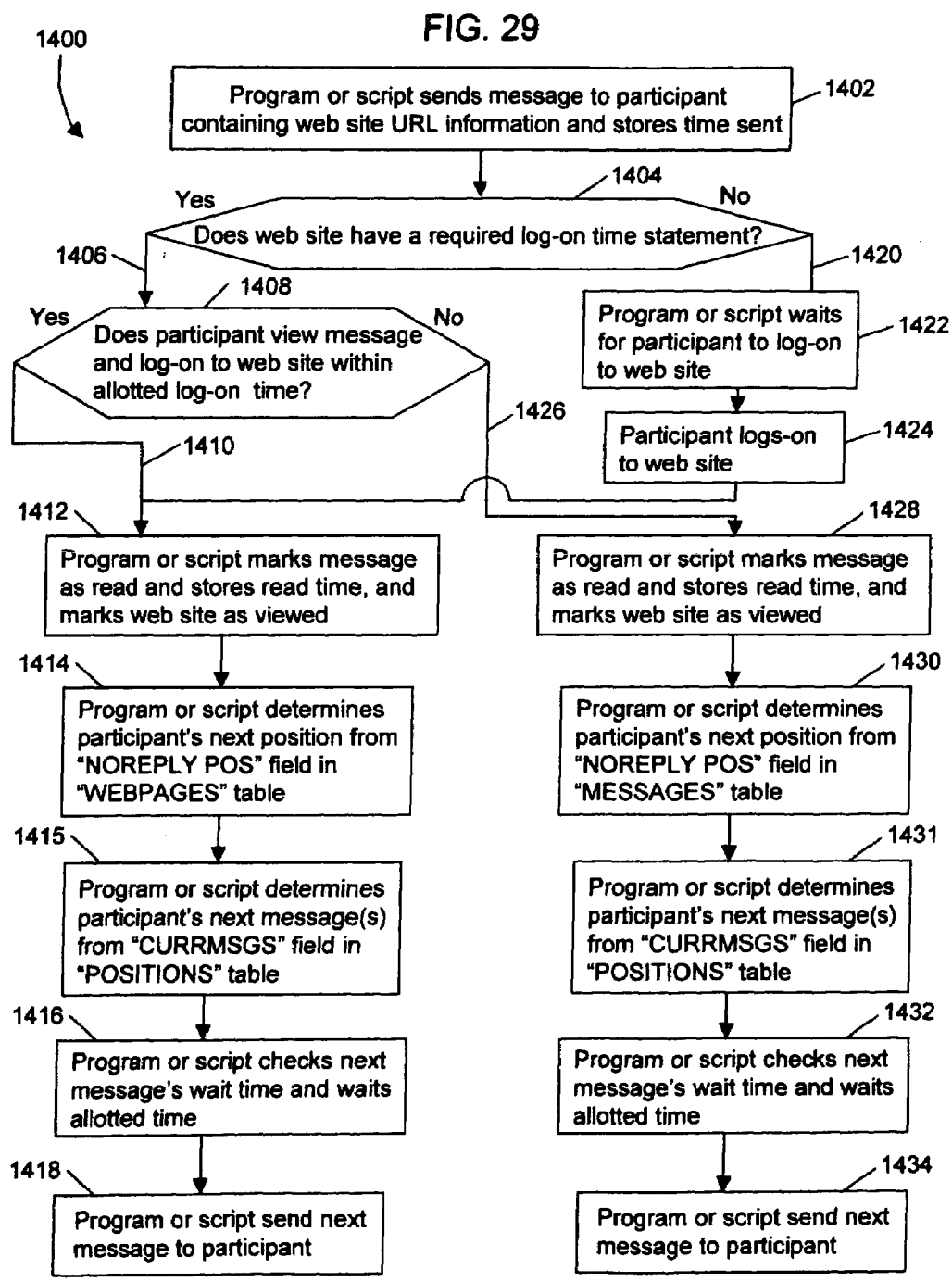

SYSTEM AND METHOD FOR INTERACTIVE, MULTIMEDIA ENTERTAINMENT, EDUCATION OR OTHER EXPERIENCE, AND REVENUE GENERATION THEREFROM

FIELD OF THE INVENTION

The invention generally relates to a system and method for providing a multimedia interactive environment for entertainment, education or other experiences or applications. The invention also generally relates to a system and method for generating revenue therefrom.

More specifically, the invention relates to using various media such as those available over the Internet in an interactive setting whereby a user participates in an interactive game, educational experience or other interactive exercise. The invention also relates to various mechanisms whereby the multimedia interactive environment is used to generate revenue from advertising, referral fees, licensing and the like.

BACKGROUND OF THE INVENTION

In the past, there have been attempts to develop the use of interactive media in an enticing manner for entertainment, education or other purposes. With the advent of the World Wide Web and the Internet, web sites have been established that seek to merge and/or simulate various forms of media for entertainment or other purposes. For example, some web sites now offer video and/or audio capability. Digital media companies have also offered niche-oriented streaming video clips to individuals surfing the World Wide Web. Other web sites sell books, compact discs and other entertainment items. And still other web sites provide contests whereby participants attempt to correctly answer questions, solve puzzles or predict the outcome of a set of circumstances.

Another manner in which interactive media has been used involves associating television with the World Wide Web. Here, an individual viewing a television program may be encouraged to visit a web site that complements, or is associated with, the television program. For example, a TV news program may encourage viewers to visit a web site to read additional information on the news story being televised. As another example, certain crime story programs on NBC encourage viewers to visit MSNBC and vote on whether the accused is guilty or not. As another example, a game show may encourage viewers to visit a web site to purchase merchandise related to the show. A current application of this is WEBTV™.

In connection with the foregoing, many web sites use various mechanisms to generate revenue. For example, banner advertisements, links between sites and referrals fees are common on today's web sites.

However, existing attempts to use interactive multimedia for entertainment or other purposes, are ultimately passive in nature. They are not truly interactive or are interactive in a very limited sense. For example, in the streaming video clip example referenced above, the user may view the video on demand, but then just passively watch it. Where a person enters a contest on a web site, he or she typically enters information and then just sits and waits to see if he or she wins. Similarly, if a TV viewer logs onto a web site associated with the TV program to learn more about a news story, the viewer simply logs onto the web site and reads the test and perhaps looks at some pictures. And if a viewer watches a television show and logs onto a web site to buy merchandise, the viewer orders the merchandise and that is the end of it.

Thus up to this time, there has been no system or method to offer a truly interactive multimedia experience for entertainment, education or other purpose. Consequently, there has also been no system or method for generating revenue that would benefit from truly interactive multimedia forms of entertainment, education or other applications.

SUMMARY OF THE INVENTION

In one aspect of the current invention, the foregoing shortcomings are overcome by the effective use of various media, such as those available over the Internet, to provide an individual with a personalized, interactive entertainment, education or other type of experience. A host server coordinates the various forms of media and communicates online to the individual's computer or other online device.

In one embodiment, a participant assumes the role of a character in a story line. The participant interacts with events and other characters in the story and is presented with varying sets of circumstances as the story line progresses to which he or she reacts interactively. The story line is generally conveyed to the participant through messages from other characters and web messages from other characters and web pages that provide text, video, audio and/or other media forms. The participant is asked to make decisions based on the circumstances presented and these decisions are communicated to the host server. The participant is provided access to web pages that textually, visually and verbally describe how the decision played out and how the story line will proceed based on the decision. New sets of circumstances may then be presented to the participant and the participant is again asked to make decisions in response thereto until the story reaches an ultimate or interim conclusion.

In another embodiment, the participant may retain his or her own identity while participating in a story line, such that the participant is drawn into a seemingly real-life adventure. In this embodiment, the story line is generally not described to the participant. Instead, the story line simply evolves around the participant much as events in the participant's life would. The participant is faced with circumstances that he or she responds to, and then learns of the consequences of those decisions which set the stage for the evolving adventure. This embodiment features the use of realistic web pages such as an online newspaper and securities trading account to convey information on the story line.

In another embodiment, aspects of the first two embodiments are combined. That is, textual, visual and audio web pages are used in connection with various other media to convey the progress of the story line.

In the foregoing embodiments, the interactive nature of the current invention is reflected in that the participant's decisions may affect the progress and/or the outcome of the story line. And because many forms of media may be used, the current invention's interactive nature is enhanced. In the game example above, the participant may interact with the story line via e-mails, on-line voice mail, web sites, television, radio, fax, pagers, telephones and/or other media or forms of communication. As such, the current invention presents an enticing form of multimedia, interactive entertainment for the participant that uses common forms of media and communication that the participant uses in everyday life.

For example, it is generally true that people look forward to receiving e-mails regarding interesting and/or personal subjects as opposed to the routine e-mails many people typically receive. The current invention involves lifelike interaction between the participant and the story line's events, characters and circumstances via e-mail. The participant may thus look forward to receiving personalized e-mails from characters in the story in order to make decisions on how the participant will interact. The participant may also look forward to receiving e-mails to learn about how his or her decisions affected the progress and/or outcome of the story line.

In another aspect of the invention, various methods are employed to generate revenue. This includes novel methods in and of themselves, as well as existing methods that are used in novel applications.

BRIEF DESCRIPTION OF THE FIGURES

FIG. 6 is a sample e-mail message sent to a participant.

FIG. 7a represents an online voice mail.

FIG. 7b shows the text of an online voice mail for when sound card capability is not available.

FIG. 8 is a sample e-mail message sent to a participant.

FIG. 9a is a sample e-mail message sent to a participant that presents a decision to be made and decision choices and link to character bio web page.

FIG. 9b is a web page showing a sample character bio.

FIG. 9c is a decision web page.

FIG. 9d is a web page conveying the results of a decision.

FIG. 10a is a sample e-mail message to a participant that includes a link to a web page.

FIG. 10b is a web page that conveys a portion of the story line.

FIG. 11 is a sample e-mail message to a participant.

FIG. 12a is a sample e-mail message to a participant that presents a decision to be made and decision choices.

FIG. 12b is a decision web page.

FIG. 12c is a web page conveying the results of a decision.

FIG. 14 is a sample sign-in page for an e-mail account provider set up for the participant in another embodiment of the current invention.

FIG. 15a is a sample web page created to resemble a real life newspaper web page.

FIG. 15c is a sample web page containing a news article.

FIG. 16b is a sample web page indicating that the participant needs an ID and password to access the desired information.

FIG. 16c is a sample web page created to resemble an online securities portfolio.

FIG. 20 shows a mailboxes table.

FIG. 21 shows a messages table.

FIG. 22 shows a positions table.

FIG. 23 shows a replies table.

FIG. 24 shows a users table.

FIG. 25 shows a web pages table.

FIG. 26 shows software scripts that may be used to interact with fields in databases.

FIG. 27 is a flow chart showing a triggering event whereby the story line software sends a message to a participant and no reply is solicited.

FIG. 29 is a flow chart showing a triggering event whereby the story line software send a message to a participant containing a web site information and stores the time the message was sent.

DESCRIPTION OF THE PREFERRED EMBODIMENTS

The current invention allows a participant to interact with various media and forms of communication while participating in an evolving story line. The participant interfaces with characters, events and circumstances presented by the story line, and also makes decisions which affect the progress and outcome of the story line.

Figure 1:
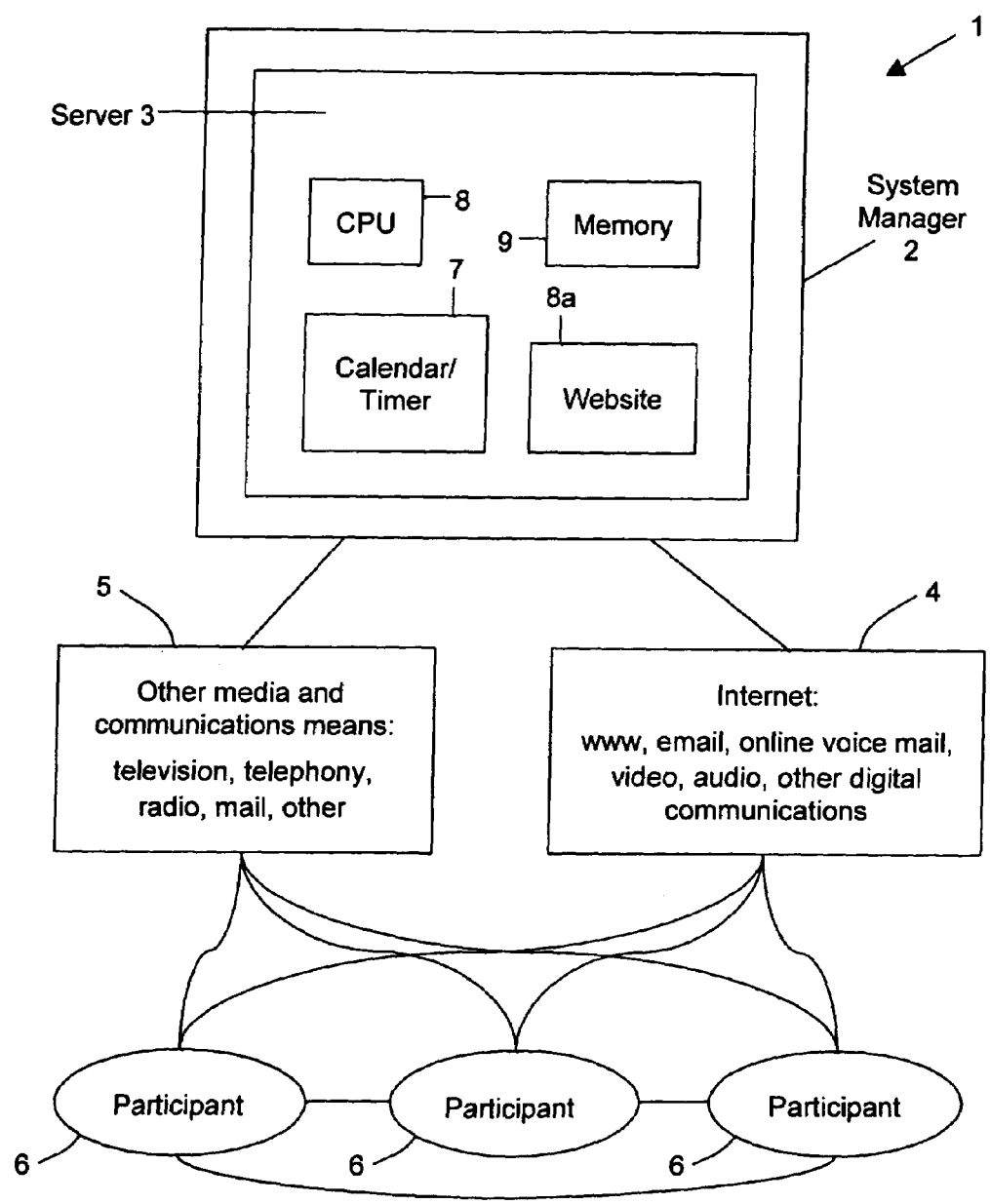
FIG. 1 is a schematic of a system configuration associated with the current invention.

FIG. 1 depicts a preferred system configuration of the current invention. As shown, the system 1 may comprise a system manager 2 that may generally control the progress of a story line. System manager 2 is preferably connected to the Internet 4 and other non-Internet media and forms of communication 5, mail and analog telephony, that are in turn connected to participants 6. In this manner, system manager 2 may send and receive messages to and from participants 6 as a story line progresses through a multitude of media and forms of communication 5. Participants 6 may interface with system manager 2 through personal computers, other Internet appliances or other means that preferably provide access to the Internet 4. As shown, participants 6 may interface amongst themselves.

It should be noted that the phrase "non-Internet media and forms of communications" is not intended to mean that such media and communication forms are completely separate from the Internet. This is because many media and forms of communication are merging with the Internet. Accordingly, "non-Internet" generally refers to media and communications that may be used with little or no reliance on the Internet. Furthermore, the current invention includes the use of media not specifically referenced in FIG. 1.

System manager 2 preferably includes host server 3 on which the story line and supporting software may reside. Server 3 preferably includes an applicable operating system such as one that may interface with the Internet. Server 3 also preferably includes software that allows it to interface with participants 5 and control the progress of the story line. Server 3 also preferably includes a suitable CPU 8, memory 9 and clock or timer 7 which may also interact with server 3 as the story line progresses. Clock/timer 7 may also include a calendar.

Memory 9 may comprise a hierarchy of various databases that reflect information on the story line. As the story line progresses due to the participant's 6 interaction with system manager 2, certain databases may be called up to provide the appropriate information. A web site 8a may also be associated with system manager 2. System manager 2 may also write to or otherwise communicate with various databases to keep track of participant's interactions and position in the story line.

In general, system manager 2 provides a story line to participants 6 through Internet 4 or non-Internet forms 5 of media and communication. For example, events, characters and circumstances of the story line are conveyed to participant 6 through Internet-related media such as e-mails, web pages and web sites existing on the World Wide Web, on-line voice mail, video and audio segments, and/or non-Internet media such as the mail, telephony, etc. In response to this information, participant 6 makes decisions or takes action regarding how he or she will respond to or otherwise deal with the events, circumstances and characters of the story line. The participant's decisions and actions are conveyed to system manager 2 via host server 3, and based thereon, system manager 2 provides subsequent segments of the story line. In this manner, the story line evolves as the participant interacts therewith.

The story line may be generally scripted such that it has a starting point and an outcome. The outcome may be final in that the story is over, and if the participant wants to play again, a new story may be presented. Alternatively, the outcome may be an interim conclusion such that the outcome represents the conclusion of a segment of events that have occurred so far. Here, the participant may continue on to another interim outcome or a final outcome.

The story line may make many twists depending on decisions made and actions taken by the participant. Accordingly, a given story line may progress differently and may also have a different outcome depending on the participant's decisions. As indicated above, the participant preferably interacts with other characters and circumstances of the story line via any one or more media such as e-mail, on-line voice mail, web sites, mail, faxes, television, radio and telephony. The participant's interaction with other types of media are also contemplated within the scope of the current invention.

In order for a participant to interface with the story line and the various forms of media therein, the participant preferably signs up with system manager 2 online. For example, and not by way of limitation, the participant may log onto the DARETOPLAY.COM$^{SM}$ web site and provide whatever contact information he or she desires to provide, e.g., e-mail address, postal address and telephone and fax numbers, etc. Alternatively, the participant may log onto whatever site is hosting the story lines of the present invention. The participant may also provide other personal information about himself or herself, e.g., likes and dislikes, personality traits, etc., so that the story line may be more personalized according to the participant's traits.

Providing such information may be accomplished by the participant simply responding to prompts appearing on the screen of his or her computer, television or other media. Alternatively, the participant may telephone system manager 2 and provide his or her contact or other information telephonically. It is preferred that system manager 2 becomes aware of the types of media and forms of communication that are accessible to the participant. This way, the story line may progress via as many media forms as possible thereby enhancing the real-life quality to the story line.

However, it may be that the participant wants to divulge only limited personal contact information. For example, the participant may feel comfortable providing only an e-mail address but not a phone number. While this may foreclose certain media through which the story line may be conveyed, the story line may still progress with the media specified by the participant. Furthermore, an embodiment of the current invention involves setting up an e-mail account and other lines of communication between system manager 2 and participant 6 thereby avoiding the need for the participant to divulge significant personal contact information. Whatever method is used to sign up, it is preferred that appropriate security measures exist to protect the information provided by the participant.

After the participant is signed up with system manager 2, the story line may begin. The story line may proceed according to a flowchart, but to enhance the randomness of the story by creating twists and turns in the story line, the flowchart preferably includes a plurality of possible routes that depend on the interactive decisions made by the participants.

Figure 2:
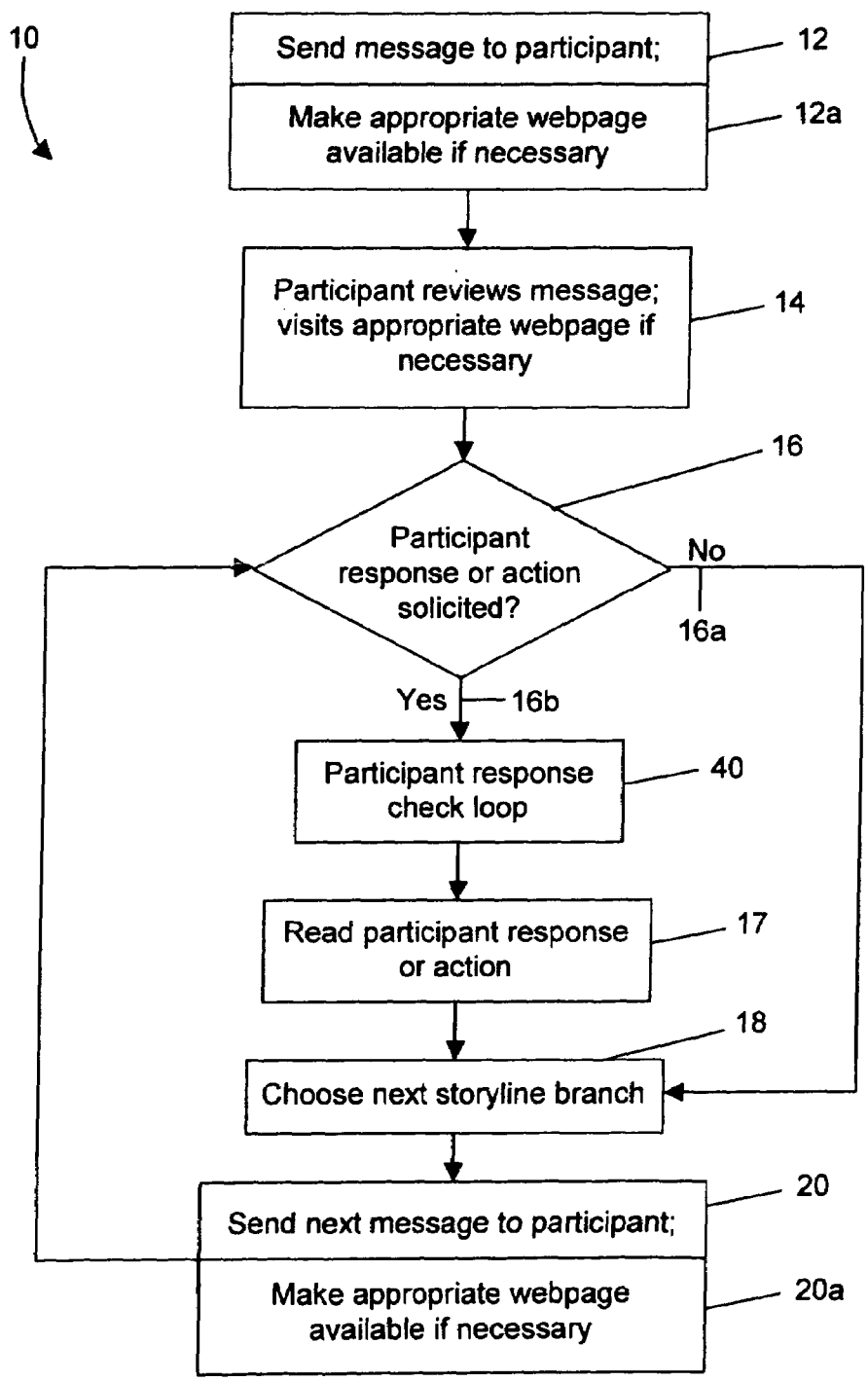
FIG. 2 is a flowchart showing the process of a sample decision to be made by the participant in response to the story line circumstances presented.

A sample decision process by the participant is now described with reference to FIGS. 2 and 3. It should be noted that FIG. 2 shows the use of web pages which are provided to the participant in one embodiment of the current invention. In this embodiment, the web pages convey the story line, the characters therein, the decisions to be made by the participant and the consequences of those decisions. Subsequent web pages are provided and decisions are made so that the story line evolves by taking the participant's decisions into account. In another embodiment, the decision process of FIG. 2 may generally proceed the same, but need not involve the use of web pages that convey the story line as in the first embodiment.

A sample decision 10 to be made by the participant and the associated steps are shown in FIG. 2. It will be appreciated that there are preferably many decisions 10 to be made over the course of the interactive story line, and such decisions will effect twists and turns in the story line en route to the outcome. The following decision process is representative of decisions that may be made by the participant at the beginning, middle, end or anywhere else during the story line's progress. The following decision process may also be used in an embodiment involving the web pages mentioned above, or in other embodiments discussed later.

As shown, message 12 is sent to the participant. In order to enhance the realism of the story line, it is preferred that the message be personalized, e.g., addressed to the participant by name. Message 12 may take a variety of forms such as an e-mail that appears on the participant's computer. In one embodiment of the current invention, the e-mail presented to the participant may not really comprise an actual e-mail, but instead may be text from a database that is made to look like an e-mail. Alternatively, message 12 may comprise a voice mail message on the participant's phone, an on-line voice mail delivered to the participant's computer, a fax, a letter or a package delivered via US mail or some other courier service. Alternatively, message 12 may be delivered via a pager, or over the television or radio.

Where message 12 is an e-mail, the e-mail may be sent to the e-mail address supplied by the participant when signing up to play the game. Alternatively, where the participant did not want to provide his or her own actual e-mail address, an e-mail account or other contact means may be established for receiving messages. Message 12 may provide different types of information. For example, message 12 may be an e-mail or voice mail from a character in the story introducing himself or herself. In the case of an e-mail, the e-mail may be written with language, e.g., slang, proper English, etc., so as to indicate what type of person the character is. In the case of a voice mail, the character may have a certain type of voice, e.g., gruff, sexy, etc. Either way, the message preferably lends realism to the story line.

From the insight on the character provided by message 12, the participant's decisions that he or she makes later on in the story line may be affected. For example, where the initial message indicates that the character might not be able to be trusted, a participant's later decision 10 might reflect a lack of trust in that character. Instead of providing information on a character, message 12 may alternatively provide the participant with background information of the story line, or may comprise clues to the participant. In any event, the current invention contemplates that the content and form of message 12 may take many forms.

As shown in FIG. 2, and in a first embodiment of the current invention, the step of providing message 12 may also include the step 12a of making an appropriate web page for the participant to visit. The web page address may be provided in message 12, e.g., in the form of a hyperlink, so that after the participant receives the message, he or she may easily visit the web page. The web page created in step 12a may comprise more detailed background information on the story line, may provide a biographical summary of a character in the story line or may convey other pertinent information.

Because various forms of media may be conveyed through a web page, e.g., text to read, pictures and video to look at, audio to listen to, the story line and the characters therein may be presented to the participant in a lifelike manner. For example, where the web page is a character bio, the web page may include a video/audio clip where the character appears to be speaking to the participant. In this manner, the character's mannerisms may be realistically conveyed so that the participant has a good idea of the type of person he or she will be dealing with later on in the story line. Alternatively, the web page may include a series of pictures showing where the story line is taking place. In sum, using web pages with various media enhances the multimedia and lifelike attributes of the current invention.

Upon receiving message 12, the participant reviews the message as in step 14, and if so instructed, visits and reviews the appropriate web page created in step 12a. By the participant's reviewing the message and/or visiting a web page, a signal is sent to host server 3 of system manager 2. This allows system manager 2 to keep track of where the participant is in the story line. System manager 2 may also keep track of the time and date when the participant reviewed the message or visited the web page. Also, the current invention contemplates the situation whereby the story line proceeds a given time after the participant has reviewed or otherwise opened a message 12 or web site 12a. To this end, the signal sent to system manager 2 may be sent to timer/clock 7 (shown in FIG. 1) that may allow a certain time to pass after receiving the signal (representing that the participant has reviewed message 12) before the story line proceeds.

Message 12 or the web page created in step 12a, may include a request that the participant respond, make a decision or take some other type of action as shown in step 16. As shown, if no decision or other action is required of the participant, the decision process 10 may follow the "no" route 16a. If the participant is required to make a decision, the "yes" route 16b may be followed.

The "no" route 16a generally involves the situation where the message and web page reviewed in step 14 are more or less for informational purposes only. Because no response or action is solicited from the participant, the story line may proceed along the "no" route 16a to step 18. At this point, the system may choose the next story line branch whereby the system proceeds along with the story line. Because the "no" route 16b does not actually involve a participant decision that will affect the story line, step 18 in this case does not generally involve the situation where the story line could be altered. This is in contrast to the situation where a participant makes a decision that could alter the story line.

The system manager 2 may then send the next message to the participant as shown in step 20 thereby starting another decision process 10. In connection with this next message 20, another web page may be made available to the participant as shown in step 20a. As shown in FIG. 2, this brings the participant back to step 14 whereby the new message and new web page (if a web page is provided) may be reviewed. Several informational "no" loops 16a might be presented to the participant at the beginning of the story line in order to acclimate the participant to a set of existing events and circumstances that provide a backdrop for decisions 10 that the participant will have to make. That is, several informational messages 12 may be provided to participant 6 that require no response. Despite no response being required, system manager 2 may advance the story line based on the signals it receives by virtue of the participant reviewing a message or visiting a web page.

Where step 16 does require a decision, response or other action from the participant, the "yes" route 16b of FIG. 2 is followed. The decision may be solicited by providing the participant with a web page that describes certain circumstances of the story line. The web page may then end with several choices for participant's courses of action in response to those circumstances.

As shown in FIG. 2, after a response is solicited from the participant, a participant check loop 40 may then be encountered. Though this is described in more detail in connection with FIG. 3, response check loop 40 is triggered when the prior message and/or web page is opened. Loop 40 (in connection with timer/clock 7) may then provide participant 6 with a certain amount of time to provide the decision, response or other action solicited by system manger 2. In some respects, loop 40 may be considered a mechanism that keeps the story line progressing even if the participant fails to make a decision or otherwise respond to the decision request in a given message or web page. In this manner, the realism of the story line may be enhanced because as in real life, failing to make a decision is still a decision nonetheless with its own set of consequences.

After the participant makes a decision by selecting a course of action, system manager 2 reads the decision as shown in step 17. System manager 2 then chooses the next story line branch based on that decision as shown in step 18. Based on the story line branch chosen by system manager 2, another decision process 10 is initiated whereby another message is sent as in step 20 and another web page is provided as in step 20a.

Figure 3:
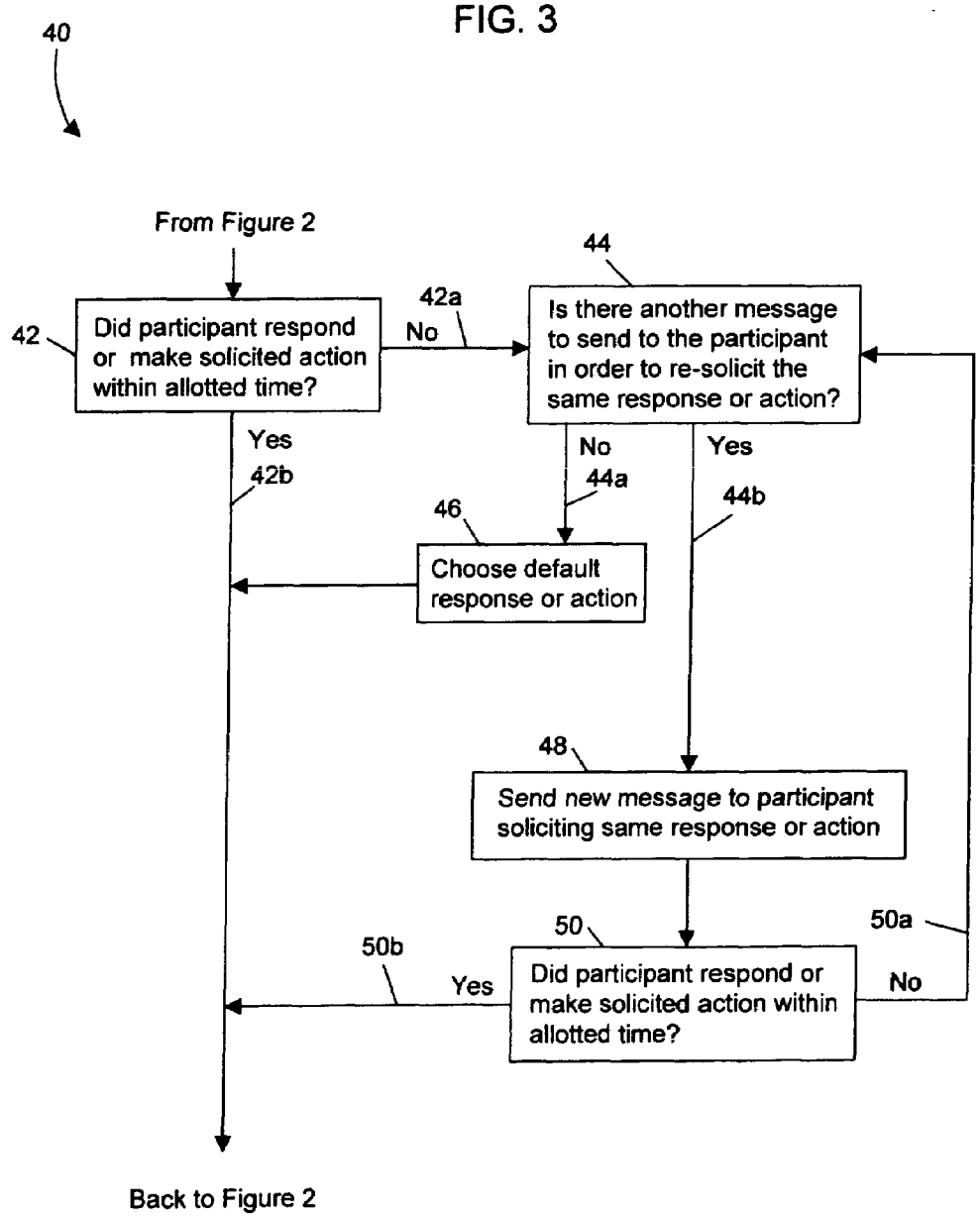
FIG. 3 is a player response check loop whereby the system monitors whether the participant has made the requested decision in order to control the progress of the story line.

Referring now to FIG. 3, response check loop 40 is now discussed in more detail. In general, where a decision or other action is requested by message 12 (or web page 12a), loop 40 may provide that the participant be given a certain amount of time to make a decision. As shown, loop 40 may first determine whether the participant responded or made the solicited action within the allotted time as in step 42. The allotted amount of time is preferably started when the message and/or web page is opened by the participant, and may be measured by the timer/clock 7 shown in FIG. 1.

If the participant did not respond or take action within the allotted time 42, the "no" route 42a may be followed which leads to a possible repeat step 44. Possible repeat step 44 essentially determines whether the message (for which no decision has been made) will be sent again or not. If step 44 does not involve a repeat whereby message 12 (FIG. 2) is resent to solicit the same response or action by the participant, the story line will proceed along the "no" route 44a. Here, a default response or action 46 may occur automatically, and the story line may proceed based on the nonresponse.

For example, the participant's decision may have involved contacting another character within a day's time to leave on a trip together. If the participant failed to do so, the system manager 2 may choose a story line branch as in step 18 of FIG. 2, based on a default response or action 46 whereby the character goes on the trip without the participant. Accordingly, the next message 12 and/or web page 12a sent to the participant in step 20, 20a may reflect that the character has gone on the trip without the participant. In this scenario, the message and web page of step 20, 20a may request a decision from the participant on whether he or she wants to catch up to the character on that trip. As mentioned above, the default or automatic response may enhance the realism of the story because once again, the failure to make a decision is a decision in and of itself.

Alternatively, possible repeat step 44 may include a repeat mechanism whereby "yes" route 44b is followed and message 48 is sent to the participant after an allotted time asking for the same or similar response or action as did message 12 in FIG. 2. While repeat route 44b may foreclose certain routes that the overall story may take based on a lack of response, it is noted that many participants may have busy work and personal lives such that they cannot continuously be checking for messages 12. As such, this represents an advance of the current invention in that the story line may be programmed to provide the participant with the time to participate. If the story line were to simply proceed without any input from the participant, there would not be much satisfaction derived by participating. In any event, message 48 may be the same as message 12, or may be slightly different to reflect the passage of time.

After message 48 is sent, the participant is then promoted for a response and action. Here again, the participant may be provided with an allotted amount of time to respond. If there is no timely response, "no" route 50a may be followed which may again prompt message 48 due to another repeat function as in step 44. This may occur over and over for some amount of time until "no" route 44a is taken from repeat step 44 resulting in default 46 being followed and the next story line branch being chosen as in step 18 as shown in FIG. 2. The story line thus progresses with the next, new message 20 as shown in FIG. 2. This reflects the real-life notion that even busy people need to make decisions at some time before events and circumstances change.

As part of the loop 44, 44b, 48, 50, 50a whereby the participant does not timely respond, message 48 may differ slightly each time to reflect the passage of time. If the participant does respond to the repeat message 48 at step 50, "yes" route 50b is followed. At this point, the story line progresses according to FIG. 2, i.e., system manager 2 chooses the next story line branch as in step 18, and another message is sent and/or another web page made available as in step 20, 20a.

As mentioned above, timer/clock 7 may be incorporated into system manager 2 to measure how much time has elapsed since a given message was opened or otherwise received by the participant. Besides allowing the participant an allotted time to respond where a response is solicited, timer/clock 7 may also determine when subsequent messages are sent even when no response was solicited.

Where a message prompts the participant for a decision, the message may, but need not, provide a clue as to what the ramifications of the decision will be. After the participant responds, the server may process the response and may take the participant to a web page that provides detail on the ramifications of the decision by conveying a segment of the story line to the participant. As mentioned above, the web pages may contain text describing what happens, but may also contain pictures, video clips, audio clips or other media.

Subsequent messages may then be sent to the participant which may be informational and/or request a decision or other action from the participant. The participant may make decisions where appropriate and learn how the story line unfolds by visiting subsequent web pages where further segments of the story line are conveyed by various media. Subsequent messages are sent and decisions made as the story line progresses towards its interim or final conclusion.

In another aspect of the invention, it is intended that subsequent messages may not be sent to the participant until the participant has had the opportunity to review prior messages. As mentioned above, the current invention thus provides the benefit that the story line need only progress at a rate that generally matches how much time the participant may have time to participate. This avoids the situation where messages are sent out regardless to whether prior messages had been reviewed, and much of the story line passes by the participant without his or her participation.

In addition to the foregoing messages and web sites, the participant may also be assigned a home web page which may be visited throughout the story line. For example, a message may instruct the participant to check his or her online voice mail messages on his or her homepage. As such, a message may involve an e-mail as well as the act of the participant visiting his or her homepage which enhances the multimedia effect.

Now that a sample decision 10 and time-activated loop 40 have been described, a flowchart embodying a sample story line that progresses through the use of web pages is now described with reference to FIG. 4. As discussed above, it is preferred that the web pages are multimedia containing text, pictures, video, audio or other media to convey the story line. However, web pages that are only textual in nature may still be used. Some messages and web pages may only be informational, while others may request a decision from the participant.

Figure 4:
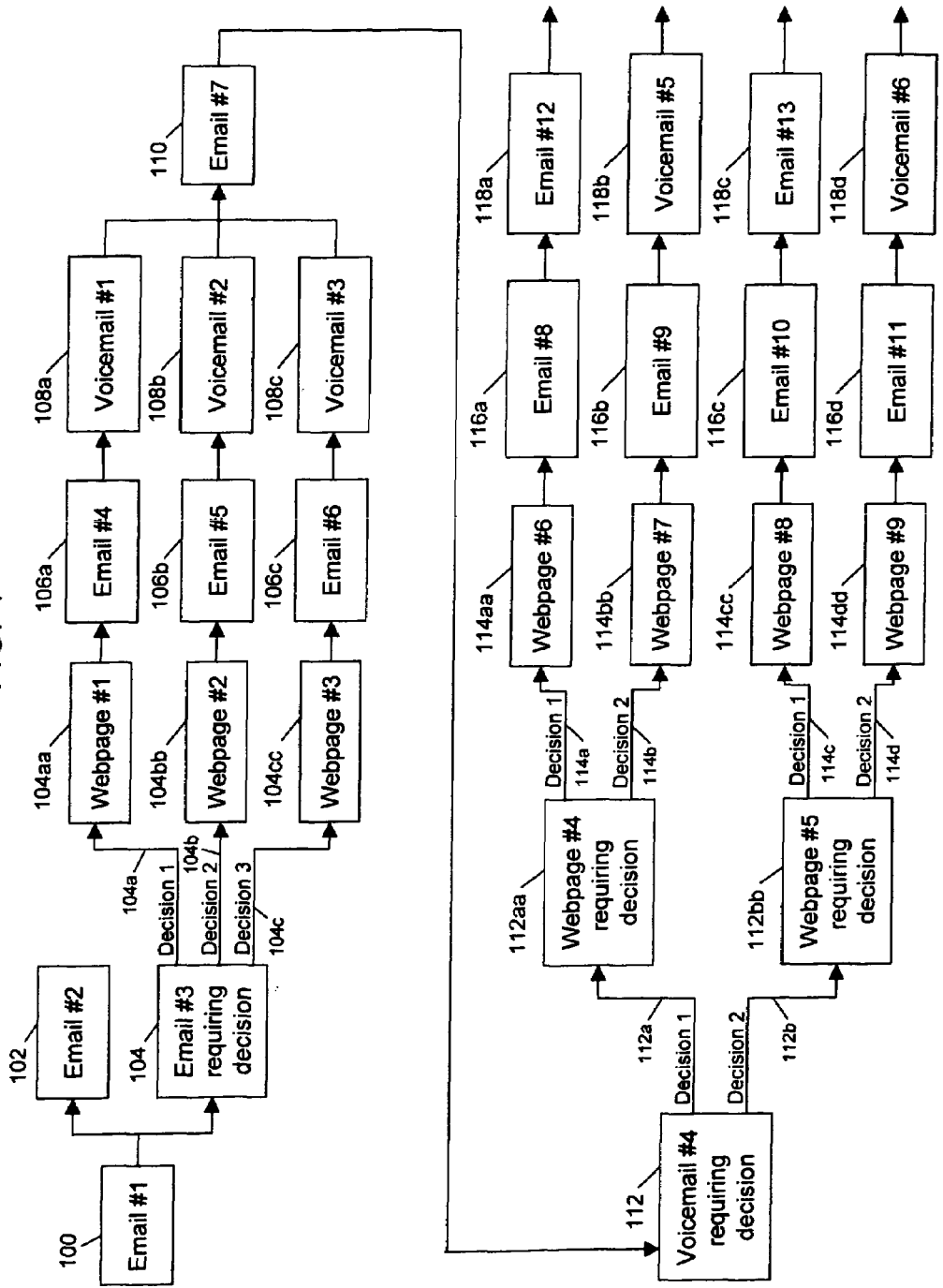
FIG. 4 is a flowchart showing how a story line proceeds by using e-mail, voice mail and web pages according to a first embodiment.

As shown in FIG. 4, message 100 may be sent to the participant. Message 100 may be sent by host server 3 of system manager 2 (FIG. 1). While FIG. 4 shows message 100 as being an e-mail, it may be sent via other types of media such as voice mail, fax, etc. For non-Internet media, message 100 may be sent by communication means 5 (FIG. 1) that may include one of the media forms listed, or other media forms. In FIG. 4, and for purposes of discussion, e-mail 100 is shown as being the first message sent to the participant, but e-mail 100 may also represent a later message to the participant in an ongoing story line.

E-mail 100 may be informational and require no response or action by the participant. To this end, message 100 may be from a character in the story or it may be a general message providing background facts. For example, in a story line where the participant is about to go on a jungle adventure, the message may be from a character that will assume the role of the participant's friend who will also be going on the adventure. Here, the message may provide information on the character that may be useful to the participant later on when making decisions. In another example in which the participant acts as a spy who works for a secret government agency, e-mail 100 may indicate that a crisis situation now exists and the agency will be sending further details on the spy's assignment. Such messages may refer to the participant by his or her real name so as to enhance the real-life aspect of the story line and immerse the participant as a true character. Initial informational messages may also convey other types of background information.

As mentioned above, system manager 2 is preferably made aware of when the participant has opened or otherwise reviewed message 100, either by the fact that the e-mail has been opened, a web site has been opened/visited, a fax confirmation sheet has been received by the host or otherwise. The time and date of when this occurred may also be noted and stored. Host server 3 may then send out another message such as an e-mail which may sent after an allotted time as discussed above.

As with message 100, e-mail 102 may also not require any response or action by the participant. Because this may be at the front end of the story line, e-mail 102 may simply provide more background information, or may be a message from another character in the story line. For example, message 102 could be from another friend who will be joining the participant and the first friend on the jungle adventure, or it could be another message from the secret government agency providing information on an international terrorist that has caused the crisis mentioned above. As with e-mail 100, e-mail 102 is preferably personalized and uses the participant's first name.

System manager 2 is preferably made aware of when message 100 has been reviewed by the participant so that message 102 may be sent. This again reflects the story line progressing at a rate appropriate for when the participant may participate. Alternatively, system manager 2 need not wait for message 100 to be opened up before sending messages 102 and/or 104. As discussed in connection with FIGS. 1 and 2, system manager 2 may simply provide a certain amount of time for the participant to review the message. If this is not timely done, system manager 2 may provide the participant with more time, e.g., through loop 40, or it may simply send another message.

To immerse the participant in the story line before the participant needs to make decisions, one or more informational messages at or near the start of the story line may be provided so that the participant is somewhat educated on the general events and circumstances of the story line. This way, the participant is provided with enough information to effectively make decisions and participate in the story when the first decision needs to be made. However, the alternative remains that the participant is not given much information at all as the story line progresses so that the participant must make the most of whatever information he or she has. This may be especially suitable for an action adventure story line where the participant is forewarned to expect the unexpected.

Referring again to FIG. 4, another message 104 may then be sent to the participant such as e-mail 104, and as shown, message 104 may require a decision to be made. When e-mail 104 is opened, system server may note the date and time, and may start the timer/clock 7 running for check loop 40 thereby giving the participant an allocated time to make the decision. By this time, the participant may or may not have some level of knowledge of the story line's circumstances to make a decision as mentioned above. But even if he or she does not, a decision may need to be made within a certain amount of time as which occurs in real life.

It should be noted that message 104 may be sent at the same time as message 102. This is somewhat representative of real life in that oftentimes, a person may come back to his computer to learn that he or she has multiple e-mails waiting.

As shown in FIG. 4, message 104 presents the participant with three decision choices: 104a, 104b and 104c. Message 104 may provide a short synopsis of each decision suggesting what the ramifications of the decision may be so as to help the participant make the decision. The participant may then make the decision by responding to the message. For example, the decision choices may be provided in e-mail 100 in the form of hyperlink or other icons, where each hyperlink corresponds to decision choices 104a, 104b and 104c. The participant may choose one of the decisions by clicking on one of the hyperlinks, and the host is made aware that the participant has made a decision.

Once the decision is made, the host may direct the participant to a web page such as one of the web pages 104aa, 104bb or 104cc that each correspond to decision choices 104a, 104b and 104c, respectively. The web page may describe the events and circumstances of the decision in more detail. The web page may also convey a segment of the story line that results from the participant's decision.

Each of the web pages preferably conveys the story line in multi-media. For example, besides providing text that the participant may read to learn how the decision played out, the web page may also contain pictures, video clips or audio clips of the events taking place in the story line. Each web page 104aa, 104bb, 104cc preferably contain different scenarios showing how the story line can progress in different ways based on the participant's decision. Thus it can be seen how the story line may progress as a flowchart with multiple paths in that each decision allows the participant to follow more than one route in the story line.

After describing the decision and conveying a segment of the story line, the web page 104aa, 104bb or 104cc may conclude with more information to apprise the participant of how the story line may develop in the future. To this end, the web page may advise the participant that he or she will be receiving another message from a certain character or another source. The participant may then close the web page and wait for the next message. By opening the web page, system manager 2 is preferably made aware that the participant is at a certain point in the story line and is ready to receive another message. In this manner, system manager 2 may note the date and time, and may start the clock/timer 7 running on a response check loop 40.

It is believed that the participant may eagerly anticipate receiving the next message. This may be compared in real-life when a person is making plans about an exciting vacation or otherwise involved in an exchange of e-mails or other messages which the person is highly interested in. Thus, the appeal of the participating in the story line is evident.

As shown in FIG. 4, that next message 106 may comprise e-mail 106*a*, 106*b* or 106*c*. While FIG. 4 shows message 106 to be an e-mail, other types of messages may be used. It is preferred that message 106*a* correspond to the story line as it has unfolded through decision 104*a* and web page 104*aa*, and that message 106*b* and 106*c* correspond to the story line as it has unfolded in decisions 104*b* and 104*c*, and web pages 104*bb* and 104*cc*, respectively. In this manner, the story line unfolds through a series of messages and web pages that logically follow one another. However, that is not to say that the story line may have unusual twists and turns that defy logic. Indeed, it is intended that the story line may proceed along distinct routes similar to how a path in a flowchart may proceed.

As shown in FIG. 4, message 106 may be informational and not request a decision or other action. To this end, e-mail 106*a* may provide information to the participant and then indicate that the participant will soon be receiving another message 108 that may take the form of voice mail 108*a*. Voice mail 108*a* may be a conventional voice mail over the participant's phone or answering machine. To this end, the voice mail may be prerecorded and sent by system manager 2 through communication means 5 to the participant's answering machine when the answering machine picks up. Alternatively, voice mail 108*a* may comprise an on-line voice mail and appear on the participant's home page as discussed above. Here, message 106*a* may instruct the participant to check his or her home page for messages.

As shown in FIG. 4, if the participant chose decision 104*b*, the participant will at this stage receive e-mail 106*b* and voice mail 108*b*. Similarly, the participant who chose decision 104*c* will receive e-mail 106*c* and voice mail 108*c*. Thus, the various routes over which the story line may proceed is shown. A benefit of such multiple routes within a given story line is that a participant may later participate in the same story line a second time but choose different decisions and thus experience a whole new story line. As well, the experience emulates real life where decisions made have a direct effect on one's circumstances.

When system manager 2 is made aware that the participant has received and/or opened message 108, the next message may be sent after a pre-determined amount of time. But as an alternative, the host may not wait for the participant to review message 108. In any event, at this point the participant may be situated in the same place within the story line regardless of whether he or she originally chose decision 104*a*, 104*b* or 104*c*. However, it will be appreciated that the participant will have undergone different experiences and subplots prior to arriving at the same point of message 110. Also, this embodiment also contemplates a story line that does not converge after diverging based on earlier decisions. In any event, the participant will have experienced some of the story line and will have received various information by the time message 110 is sent. Message 110 is shown as an e-mail, but other media may be used. As shown, e-mail 110 may provide additional information and not request a response or action.

Once message 110 has been opened and/or reviewed by the participant, system manager 2 is signaled to send another message 112. As shown, message 112 may comprise a voice mail that requires a choice to be made between decision 112*a* and 112*b*. Voice mail message 112 may be conveyed on the participant's phone and the participant may respond by pressing one of two touch-tone buttons, each corresponding to the decision. To help the participant make the decision, a third touch-tone button may be pressed to replay the decision choices. At this point, the host may leave a message for the participant to visit web page 112*aa* or 112*bb* to see how the decision played out. This can be accomplished by the participant receiving another e-mail (not shown) with a hyperlink to the appropriate web page. This e-mail would be triggered by the participant's response to the voice mail message 112.

Alternatively, voice mail message 112 may comprise an on-line voice mail left on the participant's home page and the decision may be made by the participant clicking on one of two hyperlinks that appear and that correspond to decision 112*a* and 112*b*. The participant is then transferred to either web page 112*aa* or 112*bb* depending on the decision made, and the participant may then see how the decision played out.

Web page 112*aa* and 112*bb* may again provide more detail on the events and circumstances surrounding the participant's decision. As discussed above, this may occur through text which the participant may read, as well as video or audio or other media. At the end of web page 112*aa* and 112*bb*, the participant may be requested to make yet another decision. In the case of web page 112*aa*, this is shown as decision 114*a* or 114*b*. In the case of web page 112*bb*, this is shown as decision 114*c* or 114*d*.

As discussed above, a short synopsis of each decision choice may be given so that the participant has some basis on which to decide what decision he or she wants. The participant may make this decision by clicking onto one of the hyperlinks associated with each decision choice. The participant is then transferred to another web page linked to the decision chosen, i.e., web page 114*aa* for decision 114*a*, web page 114*bb* for decision 114*b*, web page 114*cc* for decision 114*c* and web page 114*dd* for decision 114*d*. Thus, it can be appreciated just how many possible routes the story line may take.

In similar fashion as prior web pages, the participant may view another story segment in web page 114*aa*, 114*bb*, 114*cc* or 114*dd*. By the participant's opening the web page to review it, the host will then be made aware that the participant is ready to receive another message. As shown in FIG. 4, this message may comprise one of e-mails 116*a*, 116*b*, 116*c* or 116*d*. Message 116 may not require any response or action, but may instead provide the participant with more information for the upcoming portions of the story line.

Once message 116 has been reviewed, the host may then send out another message 118. As shown in FIG. 4, message 118 may comprise different media such as e-mail 118*a*, voice mail 118*b*, e-mail 118*c* or voice mail 118*d*. Message 118 may or may not require another decision or other action. Ultimately, the foregoing steps may be repeated until a conclusion to the story line is reached. As discussed above, the conclusion may be a final conclusion where the story line is over. Alternatively, the conclusion may be an interim conclusion and the participant may elect to go forward with the next portion of the story line, or may elect to end and participate in another story line.

As discussed above, this first embodiment of the invention may involve the participant interacting with various media such as e-mails, faxes, voice mails and the telephone. As such, the story line may require the participant to have access to all these media. While this enhances the real-life aspect of the invention, it may be that the participant does not easily have access to his or her phone or fax machine.

This may occur, for example, when the participant is travelling but still wants to participate in a story line.

Accordingly, the current invention contemplates an alternative whereby the participant may interact and participate with the story line over a browser dedicated to the story line and that contains all the necessary resources to participate. For example, the browser may comprise a personalized home page for the participant that contains the participant's voice mail, e-mail, web pages containing character biographies, access to the decision alternatives and their associated web pages, as well as game summaries, all in one place. This alternative provides the advantage that the participation in the story line is possible by logging onto this home pages from any personal computer with Internet access.

A first embodiment of the current invention is now described with reference to a sample story line 500 and the flow chart of FIG. 5. The sample story line 500 is fictional and is for purposes of describing an embodiment of the invention. No reference to the names of actual people is intended, and any such reference would be purely coincidental. The story line may start out with the participant receiving an e-mail 502 that instructs the participant to check his or her online voice mail. E-mail 502, which is shown in FIG. 6 may be personally addressed to the participant and may include a hyperlink 504 which will take the participant to a web page containing the online voice mail. The sender of e-mail 502 is indicated to by the Dare To Play system manager 2, but another sender identity may appear. Indeed, later messages would preferably list character names as the sender.

Upon visiting the web page, which is shown in FIGS. 7a-7b, the participant may check an online voice mail. As shown in FIG. 7a, the web site provides the participant with three links, "check messages" 506, "delete message" 508 and "get text message" 510. Upon clicking "check messages" 507, and if the participant's computer is equipped with a sound card, the voice mail message will play. To this end, the tone of the voice can lend realism to the story line by portraying the character who left the message. If the participant does not have sound card capability, he or she may click "get text message" 510 and the text message shown in FIG. 7b will be displayed. After the participant has reviewed the message, he or she may click on "delete message" 508 in order to delete the message. Online voice mail message 506 thus serves to pique the participant's interest by creating the anticipation of a further message.

The story line may then proceed by system manager 2 sending e-mail 512 which may be sent after an allotted time as measured from when the participant received or opened voice mail 506. E-mail 512 may be personally addressed to the participant as shown in FIG. 8, and may also introduce a character in the story line, e.g., Henry Davidson who is the attorney that will administer the decedent's estate. E-mail 512 may also advise the participant of the role that he or she will be assuming, i.e., a private detective, and may also convey the first substantive information of the story line, i.e., that the participant has come into an inheritance. For entertainment value, there are certain conditions—albeit dangerous—attached to the participant's receiving the inheritance as shown in FIG. 8.

As described later, the participant will make decisions in attempts at fulfilling these conditions. Such decisions also affect the progress and outcome of the story line. As mentioned above, the participant may have chosen this type of story line because it interests him or her, or the story line may have been randomly selected.

After e-mail 512 has been opened by the participant, system manager 2 may send another e-mail 514 (FIG. 5) which is from Sally, the daughter of the deceased. Sally's e-mail 514 is also personally addressed to the participant and may convey that she is a model and that she wants to get together with the participant to discuss the inheritance. However, Sally also warns that the participant must not be seen going to her apartment. E-mail 514 may include a hyperlink 515 to a web page 516 which serves as Sally's bio, i.e., it tells more about Sally and may also include pictures or video of her from a modeling shoot. Sally's invitation may be tempting but based on the lawyer's advice in e-mail 512, the participant may be wary.

After some amount of time from when the participant opened Sally's bio web site 516, system manager 2 sends another e-mail 518 that may be from another character named Charlie. Charlie's e-mail 518, which is shown in FIG. 9a, is addressed to the participant and provides further information about the story line as well as the role assumed by the participant. Charlie's e-mail 518 also includes a link 520 to his bio web page 522 which is shown in FIG. 9b. As shown, Charlie's web page 522 includes his picture as well as further information about him and how the participant might make later decisions based on Charlie's character, i.e., his judgment can be questionable.

In a preferred embodiment, a web site may be provided for each of the characters involved in the story line. Such "character" web sites may include a biographical summary of the character and the character's role in the story line. To this end, there may also be a "participant character" web site that describes the role of the character to be assumed by the participant himself or herself. The biographical information contained in each such web site may provide insight on how the character will interact with the participant's character thereby affecting how the story line may proceed and ultimately conclude. The biographical web sites may include pictures or audio/video clips of the character to provide an enhanced feel for the story line and how that character will interact with the participant. The biographical character web sites need not be made accessible to the participant all at once at the beginning of the story line. Rather, such web sites may be made available as the story line progresses and additional characters become involved.

After visiting Charlie's bio web page 522, the participant is faced with the first decision 524 as shown in Charlie's e-mail 518 (FIG. 9a). As shown, the decision choices are summarized in Charlie's e-mail 518 so as to provide some insight on what the decision choices entail. Here, the participant essentially chooses between meeting Sally 524a or Charlie and his friends 524b. Charlie's e-mail 518 may include a link 526 which transfers the participant to a decision web page 527 (FIG. 9c) where the participant's decision choices are represented by links 524aa and 524bb. By clicking either link 524aa (for decision 524a) or link 524bb (for decision 524b), the participant is transferred to either web page 524aaa which more fully conveys the circumstances which result from choosing decision 524a, or web page 524bbb which more fully conveys the results of choosing decision 524b. Web site 524bbb is shown in FIG. 9d. As shown, it conveys more of the story line and also includes pictures of the characters involved, e.g., the participant's companion.

Referring back to FIG. 5, it can be seen that the decision made on decision web page 527 effects two branches in the story line 500. After the participant makes a decision, the story line branch is chosen by system manager 2 as shown in step 18 of FIG. 2. Each branch may involve an online voice mail 530 which is sent to the participant some amount of time after either web page 524*aaa* or 524*bbb* is opened. To add realism to the story line, voice mail 530 may be related to the events described in either web page 524*aaa* or 524*bbb*, e.g., a call from Sally (if decision 524*a* were made and web page 524*aaa* opened) or a call from one of Charlie's friends (if decision 524*b* were made and web page 524*bbb* opened) thanking the participant for a wonderful time the prior evening. Here, the voice mail might be the same in either case because it may only be a woman's voice without identifying herself but which could be either Sally or one of Charlie's friends.

After voice mail 530 is opened by the participant, system manager 2 may send e-mail 532 after a certain amount of time. As shown in FIG. 5, e-mail 532 may be the same regardless of whether decision 524*a* or decision 524*b* were made. As shown in FIG. 10*a*, e-mail 532 may be from the attorney and this message could have been sent regardless of whether the participant met Sally (524) or Charlie and his friends (524*b*). As shown, e-mail 532 provides more information on the story line and includes instructions 534 telling the participant to retrieve a briefcase.

E-mail 532 also includes a link 536 which will transfer the participant to a web page 538 shown in FIG. 10*b*. As shown, web page 538 describes events and circumstances associated with the participant retrieving the briefcase, and may also include pictures, video or other media to enhance the realism of the story line.

After web page 538 has been opened, system manager 2 is able to track the participant's progress in the story line and may thus send another message. As shown in FIG. 5, the participant may receive either e-mail 540 or 542 depending on the branch of the story line chosen by the participant and effected by system manager 2 as shown in "choose next story line branch" step 18 of FIG. 2.

E-mail 540 may be from Sally wherein she again thanks the participant for a wonderful time, flirts with the participant and says that she wants to meet again to discuss the inheritance. Sally's message 540 may also include a link 544 to web page 548 which includes more pictures of her on a modeling shoot. Web page 548 may be in format to the character bio page shown in FIG. 9*b*. Here, the participant may be made to feel that Sally is trying to use her good looks to sway the participant's thinking on the inheritance. Thus the participant is drawn into the story line by having to think about not getting duped by Sally.

Alternatively, if the other story line branch is chosen, e-mail 542 is sent to the participant. This message 542 may also be from Sally and it may say that she was sorry that she and the participant did not get together (because here, the participant chose to meet Charlie and his friends) and that she still wants to meet the participant to discuss the inheritance. E-mail 542 may also include a link 550 to the same web page 548 containing Sally's modeling shots that may entice the participant.

After web page 548 is opened, system manager 2 may track the participant and send either e-mail 552 or 554 from Charlie, depending on which branch the participant is proceeding. E-mail 552 may convey that Charlie was sorry that the participant could not meet up with him and his friends (which would make sense because in this story line branch, the participant chose to meet with Sally). As shown in FIG. 11, e-mail 554 could convey how Charlie and his friends had a great time with the participant. As shown, Charlie's e-mail 554 might also convey circumstances about the story line, e.g., for the participant to be careful about Sally's motives. In any event, Charlie's e-mail 554 may conclude with the message that he will be in touch soon which preferably piques the participant's interest about receiving further contact about the story line.

Figure 5:
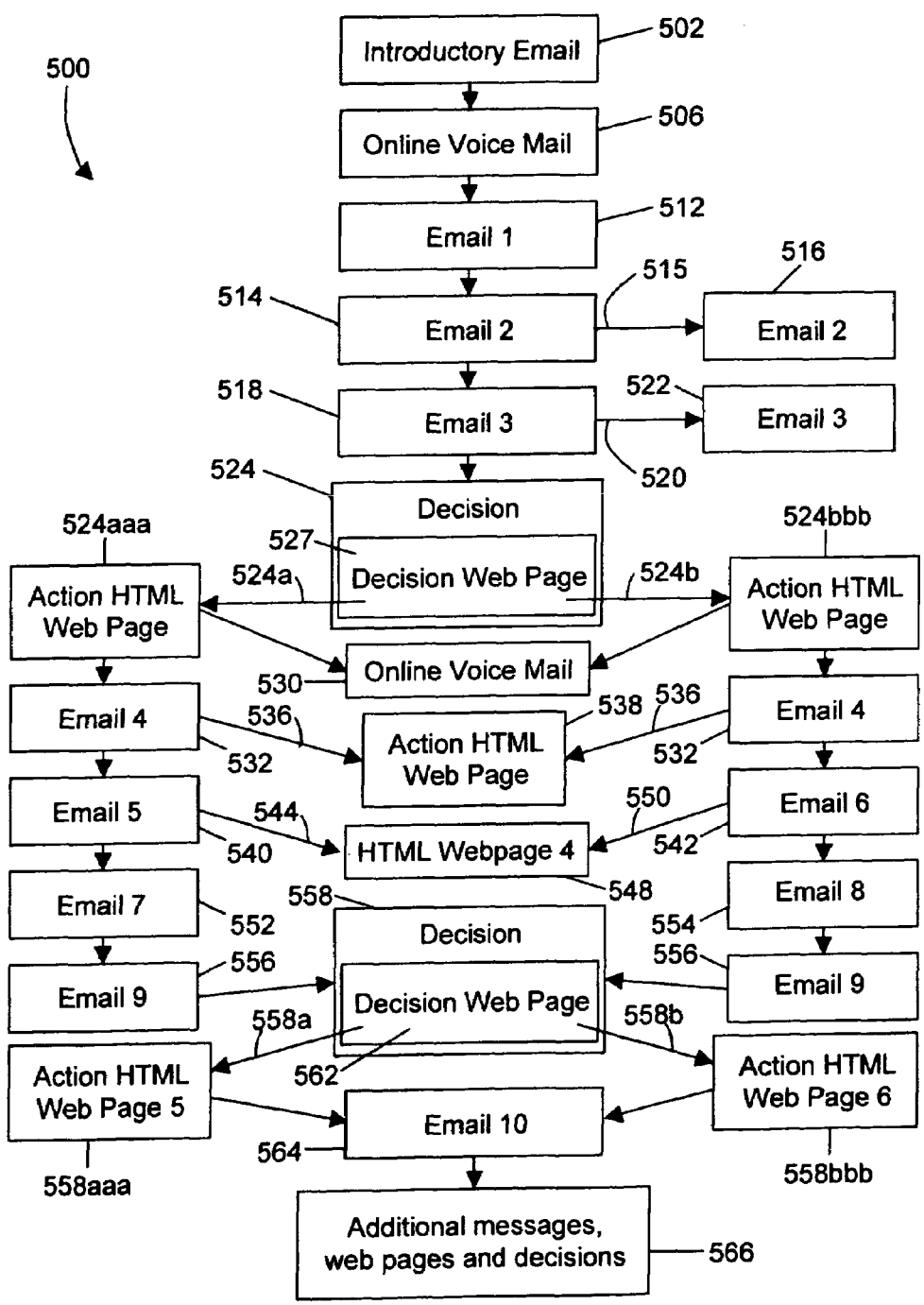
FIG. 5 is a flow chart for a sample story according to a first embodiment.

After the participant has opened either e-mail 552 or 554, system manager 2 may be made aware to send e-mail 556 which may be the same for both story line branches and which may also serve to converge the two branches as shown in FIG. 5. As shown in FIG. 12*a*, e-mail 556 is from the lawyer and conveys more information about the briefcase retrieval incident described in web page 538 of FIG. 10*b*. E-mail 556 presents the participant with another decision 558 to make between choices 558*a* and 558*b*. As shown, these choices are summarized in e-mail 556 and the participant may use link 560 to visit decision web page 562 shown in FIG. 12*b* to make the decision. To effect either decision 558*a* or 558*b*, the participant clicks on link 558*aa* or 558*b*, respectively, and is then directed to a web page 558*aaa* or 558*bbb*, respectively, that corresponds to the decision made. Web page 558*aaa*, which is shown in FIG. 12*c*, then fully conveys the results of the participant's decision 558*a*. As shown, web page 558*aaa* may include pictures to provide realism to the story line.

After either web page 558*aaa* or 558*bbb* is opened, system manager 2 tracks the participant's location in the story line and sends the next message 564. As shown in FIG. 5, message 564 may serve to converge the story line branches. However this need not be the case. Thereafter, the participant receives additional messages and makes additional decisions as generally shown by step 566 in FIG. 5 so that the story line proceeds to some type of conclusion.

Throughout the game, the participant may receive e-mails from the characters in the story line much as the participant would receive from friends in real life. Each e-mail need not have a decision choice associated with it. Instead, these random e-mails may provide more information which may come into play later on in the story line. Alternatively, such e-mails may be received to simply add a likelike, personal quality to the story line.

While the foregoing sample story line involved only e-mails, online voice mails and web pages, it is within the scope of the current invention that other media may be used as discussed prior to the sample story line.

The current invention is also not limited to the type of story line in the sample. To this end, before beginning the story line, the participant may pick a general type of story line from various categories, and may even tailor the story line to his or her liking. For example, the participant may input information about himself or herself so that the character the participant portrays will act more like the participant would in real life. Furthermore, the participant may input information about that participant's friends so that other characters in the story assume the nature of actual people that the participant knows. This type of information can be incorporated into the character web sites. In this manner, the story line assumes an even more lifelike nature thereby enhancing the entertainment value of the current invention.

It should be noted that the current invention has many applications and is not limited to story lines such as the one conveyed above. For example, the story line may be set in the past, present or future. And as mentioned above, the participant may also choose a general story line reflecting a topic in which he or she is interested. Examples of story lines include mysteries, detective or secret agent stories, adventure, action, drama, soap opera, romance, science fiction, comedy, adult, erotica and any other type of story line. The story line may also take place in various settings, e.g., foreign countries, big cities, small towns, rural areas, vacation resorts, high society, Hollywood, outer space or any other imaginable setting.

In another embodiment of the current invention involving a game, the participant may not choose the general content of the story line. Instead, the participant may be thrust into an entirely unknown story line and make decisions based on whatever circumstances arise. In this alternative, the unknown and unexpected sets of circumstances presented to the participant may enhance the realism of the story line and thus enhance the entertainment value of the game.

Regardless of the story line used, the participant is immersed in the story line due to the interactive nature of the current invention. To this end, the participant interacts with other characters in the story line and makes decisions that affect how the story line progresses. Accordingly, the character's involvement in the story line may effect plot twists and may ultimately affect the story line's outcome.

As an alternative to the game concept involving a fictional story line, the current invention may be applied for educational purposes. For example, grade school children may participate in a story line set in a historical setting whereby the children interact with historical figures and events. The children thus relive history thereby making the current invention a powerful learning tool that maintains children's interest. In this application, it may be preferred to somewhat limit the decisions a participant might make as the historical story line progresses so that history is not totally rewritten and so that an educational purpose is still served. This can also be accomplished by making the decisions affect only more minor subplots, possibly fictional, within the major educational story line so as to preserve the educational purpose.

As another educational example, military personnel may receive combat training by participating in a story line simulating combat. In this application, a whole host of unexpected circumstances may be presented to the participant to make the interactive experience as lifelike and as valuable a training tool as possible. As such, military personnel may learn how to properly react and make quick decisions in response to ever-changing battle circumstances.

Other education applications of the current invention could involve the training of professionals such as lawyers or doctors. For a lawyer, the participant may be an inexperienced lawyer who is presented with a court room setting where decisions must be made about which witnesses to present and which objections to make. For a doctor, the participant may be an inexperienced intern who participates in a story line pertaining to a type of surgery that he or she needs to learn about. The participant is presented with circumstances that reflect different stages in the surgery at hand, and may be asked questions as to how incisions should be made, what artery needs to be clamped and so on. The participant may also be presented with emergency situations that may arise during surgery such as unexpected bleeding. In this situation, the participant is required to make emergency type decisions, and may then be advised how the decision played out. Furthermore, the participant may be given only a limited time to make a decision thereby enhancing the interactive, life-like feel of the story line.

In addition to the foregoing educational applications, the current invention could be used to help teach a person a foreign language. In this situation, the participant may be set in the situation where he or she goes food shopping and must interact with people speaking the foreign language. The decisions facing the participant, and the vocabulary used, could start out relatively simple due to the participant's limited grasp of a certain language. However, as the story line progresses, which could occur over days, the decisions and vocabulary used could become more complex to maintain a challenge to the participant.

Another embodiment of the current invention is now discussed with reference to FIGS. 13-17. In this embodiment, the participant may not interface with web pages of the type described above that look like they are generally set up for the story line itself, i.e., web pages that provide decision choices and then explain the results of the participant's decisions in a storybook format. Instead the participant interfaces with the story line through media and forms of communication that look like media used in everyday life. In this embodiment, the textual web pages described in connection with the first embodiment may not be used so that the story line progresses only through realistic communications and media forms. However, the textual web pages described in the first embodiment may still be used in this embodiment, and a combination of both embodiments is expressly contemplated within the scope of the current invention.

With respect to lifelike communications with other characters, the participant may receive personalized e-mail messages from other characters in the story line. These e-mails may be addressed to the participant by name and may be personal, but yet may also be informational regarding events in the story line (at least from the viewpoint of that particular character).

As for simulated real-life web sites, the participant may be directed by one of the characters to visit a web site for a newspaper to learn some crucial facts. While the newspaper may not actually exist, the participant may be directed to a web site that, when called up, appears to be the home page of a newspaper web site. Other examples involve the participant being directed to a web site that resembles a stock portfolio web site, a web site that simulates a government database with criminal files or a web site that features a fictional model similar to the web sites that many movie stars have today. These examples are not intended to limit the scope of the invention.

Overall, this embodiment contemplates that as many or all aspects of the story line are realistic, as opposed to the web pages described in connection with the first embodiment that appear somewhat as a specific mechanism to tell a story line. That is, in this second embodiment, the entire story line may proceed with messages and web sites that would be encountered in every day life, and there may not be web pages or the like that appear like they are especially created for the story line. But as mentioned above, both embodiments could be combined.

Similar to the first embodiment, the participant makes decisions and will be presented with choices for courses of action that will ultimately affect the progress of the story line. To this end, the story line in this embodiment proceeds along one of many possible routes in flowchart fashion. However, the messages that prompt a response or action from the participant are preferably not of the type where clear-cut choices are provided to the participant as in FIGS. 9a and 12a of the first embodiment.

Instead, for example, the participant may receive an e-mail message from another character in the story line that asks a specific question. Depending on how the participant answers the question, the story line may proceed along one of multiple routes. This embodiment involves realism in that instead of the participant being presented with discrete choices represented by hyperlinks, the participant is just presented with a realistic-looking e-mail that asks a question, and the story will evolve based on the answer.

As another example, the participant may receive a message asking him or her to do a certain thing that the participant may or may not choose to do. For example, the participant may receive a message with proprietary information, and then be asked to forward the information to another character. The participant may or may not choose to forward proprietary information which is a decision that will still affect the progress of the story line.

In this embodiment, the participant is preferably set up with a fictional e-mail account on a fictional e-mail hosting service. While the e-mails and e-mail service will appear and function similarly to real-life e-mail services, the service will be dedicated to the story line. The participated may receive all his or her e-mail relating to the story line via this service web site. Accordingly, the participant will be able to log on to the e-mail web site and receive his e-mails and voice mails from any personal computer.

As with the first embodiment, the system manager 2 monitors the participant's progress through the story line by receiving signals when e-mails, web pages or other messages are received and/or opened by the participant. To this end, the clock/timer 7 may note the date and time when messages are reviewed, web page visited, etc. Also, the foregoing discussion with the decision procedural flow chart of FIG. 2 and the participant response check loop of FIG. 3 generally applies to this embodiment.

This embodiment is now described with reference to a sample story line and FIGS. 13-17. As shown in step 500 of FIG. 13, the participant may initially log onto a host web site 8a (FIG. 1) such as DARETOPLAY.COM$^{SM}$ which is associated with system manager 2, or some other location providing access to the story line in order to sign up and participate. As discussed earlier, the participant may provide contact and other personal information. It is preferred that the host web site 8a provides rules and guidance for the participant to interface with the story line. The host web site 8a may also include a "frequently asked questions" page to help introduce participants to how system manager 2 operates as well as to help existing participants with random questions that may arise while participating in a story line.

As shown in step 502, the participant may then be sent to an e-mail service provider to open up a new e-mail account for communicating with system manager 2 and/or other characters or participants throughout the story line. Or, the DateToPlay.com site may simply instruct the participant that they will automatically be registered with the partnering e-mail provider site upon initial registration. The e-mail service provider may be a mock e-mail service such as that shown in FIG. 14 that has been set up by system manager 2 to accommodate participants. Alternatively, the participant may be sent to an existing e-mail service provider, which may have some type of commercial relationship with system manager 2. Possible examples are the e-mail services provided by web sites such as HOTMAIL.COM$^{SM}$ and YAHOO.COM$^{SM}$.

Regardless of whether a mock or existing e-mail service is used, it is preferred that the e-mail service appears lifelike to enhance the realism of the story line. It is also preferred that the participant is able to access the e-mail service via any personal computer or other means having Internet access 4 as shown in FIG. 1. As shown in step 502, the participant may provide contact and other necessary information to establish an e-mail account that will be used to receive and send e-mails during the story line.

After the participant is set up with an e-mail account, an e-mail may be sent to the participant welcoming him or her to the e-mail service as shown by path 503 and step 504. This introductory e-mail might also provide advertising, links to other web sites or some other revenue-generating mechanism. When the participant opens the e-mail, a signal is preferably transmitted to system manager 2 so that it is made aware that the e-mail 504 has been opened. This may occur through mechanism commonly used by current e-mail service providers whereby an unopened e-mail message appears to the user as a hyperlink in their e-mail inbox. When the user opens the e-mail by clicking onto the hyperlink, a signal is sent to the host server and the message contained in the e-mail appears on the participant's screen.

The story line preferably involves multiple e-mails being sent to the participant and it is preferred that system manager 2 monitors when each e-mail is opened by the participant via the above-referenced signals. This allows system manager 2 to track where the participant is in the story line, and also allows system manager 2 to know when to send additional e-mails to the participant so that the story line progresses. To this end clock/timer 7 may note the date and time when messages are reviewed, web pages visited, etc.

Figure 13:
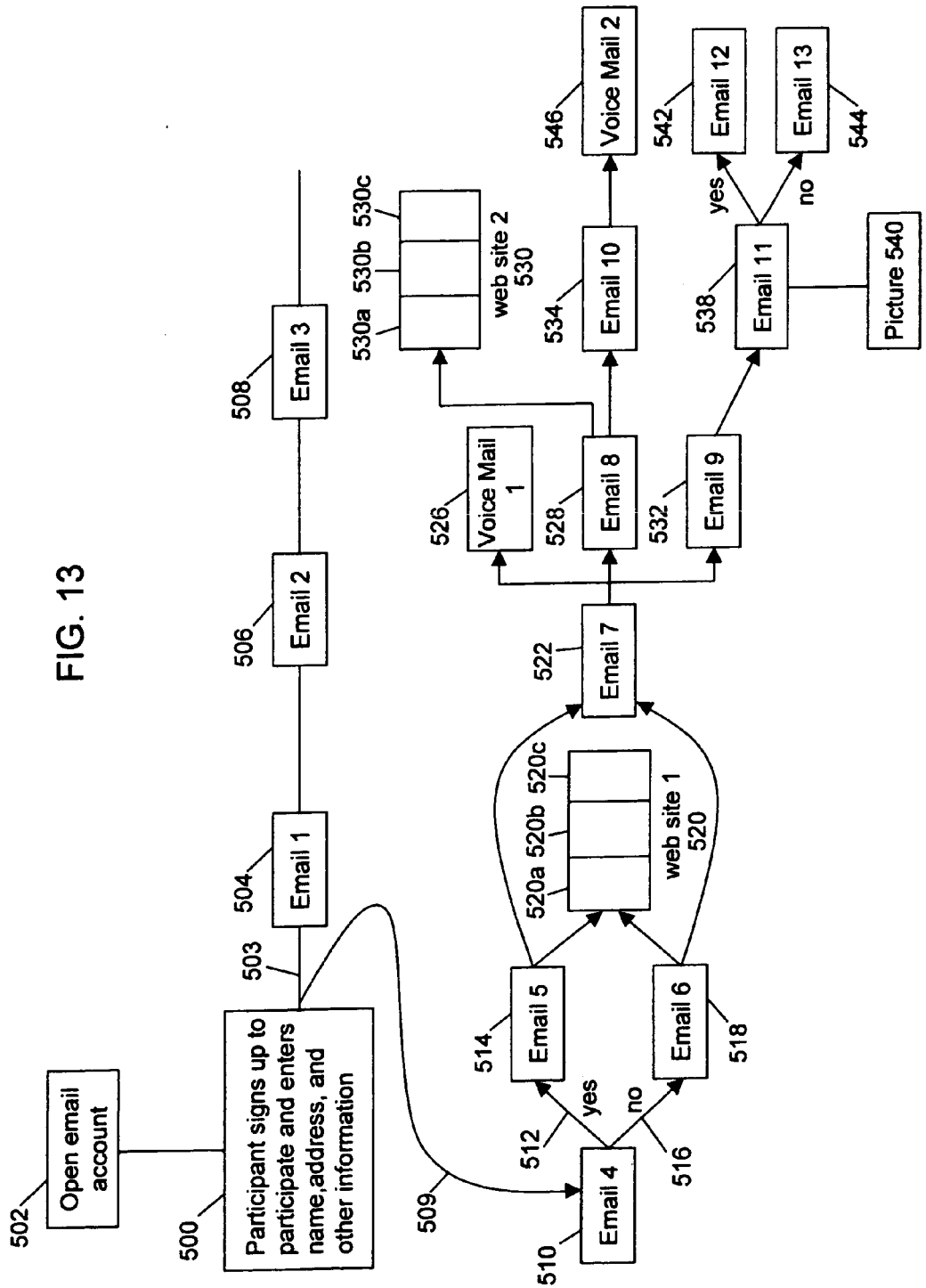
FIG. 13 is a flowchart showing a segment of a story line, and how the story line proceeds according to decisions sent from the participant and read by the host server according to another embodiment.

Still referring to FIG. 13, system manager 2 may then send additional e-mails 506 and 508 to the participant. These e-mails may not actually have anything substantive to do with the story line. Instead, e-mails 506, 508 may advise the participant that the story line has not started yet, and that the participant should keep checking his or her e-mail for an important message. Additional advertising, links or other revenue-generating mechanisms may appear in these e-mails. These e-mails may be sent as a ruse so as to pique the participant's interest as to when the story line will start. Alternatively, and as shown by path 509 in FIG. 13, e-mails 504, 506, 508 need not be sent. Instead, the participant may be immersed directly into the story line by system manager 2 sending a substantive e-mail.

This embodiment of the current invention is now further described with reference to a sample story line. For purposes of present discussion, the story line involves a case of mistaken identity whereby the participant is approached by a character named Larry who has tracked the participant down. Larry believes the participant is his long lost partner with whom he committed an armored car robbery years ago. In an added twist, the money was supposed to go to an organized crime ring. But after the actual heist, things went awry such that both Larry and the presumed participant's identity had to go into hiding. However, Larry still has all the money, is ill and wants to set things straight before he dies.

The story line may be initiated with an e-mail 510 from Larry. E-mail 510 may inquire "Are you <participant's name> from <participant's home town>?. Please answer yes or no." In this e-mail, the participant's actual name and home town would appear in the text to enhance the personal nature and realism provided by the e-mail service. As mentioned above, the participant may have provided this personal information when signing up, thereby allowing e-mail 510 to contain such personal information.

At this point, the participant may send a reply e-mail which answers "yes" or "no". Depending on the participant's response, system manager 2 may then send one of two or more e-mails to the participant sometime after receiving the response. If the participant responded "yes" as in step 512, the host server sends another e-mail 514 which may contain the following text: "I can't believe I finally found you. I hired a private investigator firm to monitor portals on the Internet and they finally tracked your name." E-mail 514 might then provide background information regarding the heist and the events that have occurred since then. E-mail 514 might also then go on to explain that some new evidence has surfaced which could possibly link Larry and the participant to the heist and thus create dire consequences from law enforcement or the crime ring seeking retribution.

As discussed above in connection with the participant response check loop of FIG. 3, the participant may be provided some length of time to respond to the e-mail before the same e-mail or a subsequent message is sent. Because e-mail 510 represents the first message regarding the actual story line, it may be preferred that the participant be provided with significant time to respond. This is preferred because if subsequent messages were sent without the participant having the benefit of reading the first message, the story line may be difficult to follow for the participant. In any event, the time delay of subsequent messages being sent is discussed in more detail later.

For further elaboration on background information on the heist as well as the new evidence, e-mail 514 may also instruct the participant to check out an article in a newspaper located at a web site 520 on the Internet. E-mail 514 may provide a hyperlink to the newspaper web site 520, as well as an ID and password so that the participant has access to the web site and the pertinent news article. A sample web site comprising a lifelike newspaper appears in FIGS. 15a, 15b and 15c.

Newspaper web site 520 may be created by system manager 2 with HTML or other suitable code. To provide realism, newspaper web site 520 preferably includes pictures of people, locations or events. As shown in FIG. 15a, the "front page" 520 of web site 520 may be similar to a front page of an online newspaper with a brief synopsis of various news articles with icons to click on for the full story. It is intended that web site 520 appears more like a real life media source, i.e., an online newspaper, rather than like a web site of the first embodiment that is generally created especially to convey the story line.

Figure 15B:
FIG. 15b is a sample web page indicating that the participant needs an ID and password to access the desired information.
Figure 16A:
FIG. 16a is a sample web page created to resemble an on-line securities trading account web page.

If the participant clicks on the "full story" icon before logging in with an ID and password, another web page 520b may appear as shown in FIG. 15b that instructs the participant to go back to the front page and log in.

It is preferred that the act of logging in to newspaper web site 520 (or any other similar type of web site that is used in the story line) will result in a signal being sent to system manager 2 and the time and date being noted by clock/timer 7. This allows the host server 3 to monitor the participant's location within the story line so that subsequent e-mails and other messages may be sent at preferred times. That the participant is required to log in to review the full story facilitates this monitoring process.

After the participant has logged in, he or she will be able to access the article that is pertinent to the story line. Upon doing so, the full story 520c as shown in FIG. 15c may appear. The story 520c provides the participant with more background information and may introduce the participant to other characters in the story line. It also provides a glimpse of what the future may hold, i.e., in this case, that a famous investigator and/or organized crime might soon be looking for the participant.

As shown in FIG. 15a, it is contemplated that the newspaper web site 520 will maintain various news stories. These various stories may pertain to other story lines that system manager 2 is maintaining for other participants. It is preferred that a given ID and password will provide the participant with access only to the pertinent article. In this manner, even if the participant logs onto the newspaper but has an ID and password that is not meant for the full story he or she is trying to read, a message similar to that shown in FIG. 15b may appear. That is, a message may appear saying that the ID and password used does not authorize the requested full story.

Referring back to FIG. 13 and back to e-mail 510, if the participant responds with a "no" as in step 516, system manager 2 may send another e-mail 518 that might contain text like "I understand your hesitancy to acknowledge me because of what happened, but . . . ." E-mail 518 could then go on to relate the same information as in e-mail 514 and instruct the participant to go to the newspaper web site as discussed above. In this manner, system manager 2 is capable of addressing whatever answer the participant may have provided in response to e-mail 510. To this end, it is preferred that system manager 2 be capable of recognizing answers that are akin to "yes" or "no" in case the participant answered with other than a straight "yes" or "no".

As mentioned above, the host may keep track of the participant's progress in the story line by monitoring when e-mails are opened. In similar fashion, the host may track the participant by seeing when web sites such as newspaper web site 520 are visited due to the logging in with the ID and password. Accordingly, the participant's location in the story line is monitored so that subsequent communications to the participant are sent at times when it logically makes sense in the given story line.

Accordingly, after the participant has visited web site 520, system manager 2 may know to proceed with the story line sending e-mail 522 which may introduce another character. For purposes of present discussion, this next character is named Sally who claims to be Larry's niece. But in reality, Sally is a "black widow" con artist who is trying to convince Larry to invest the money from the heist in a fake charity. Sally has become aware of the participant and now views the participant as an obstacle to her plan. Accordingly, Sally plans to seduce the participant into doing what she wants. This information is not wholesale conveyed to the participant, but instead is to be learned as the story line progresses.

E-mail 522 may be from Sally and addressed to the participant's name. In e-mail 522, Sally claims to be Larry's niece and that she is looking over him because he is very ill. Sally's e-mail 522 also claims that she heard Larry was trying to contact the participant and thus found out the participant's e-mail address. In keeping with Sally's conniving nature (unknown to the participant at this point), Sally's e-mail 522 continues on by saying that she knows Larry wants to do the right thing before he dies which is to give his lost partner a share of the money. However, Sally also says that she believes that the participant is not who Larry thinks he or she is, and consequently, Sally asks the participant to back off.

When the participant opens and reads e-mail 522, system manager 2 preferably receives a signal indicating that the participant has opened the e-mail and that the next communication(s) with the participant is in order to proceed along the story line. The additional communications may take various forms as described above. It should also be noted that the reading of an e-mail may spawn more than one additional communication. To this end, FIG. 13 shows that the opening of e-mail 522 results in online voice mail message 526 and e-mails 528, 532 being sent.

The story line contemplates that the online voice mail message 526 is from another character in the story line who is Larry's personal assistant and whose name is Nicole. Message 526 may explain that Nicole is Larry's personal assistant and that she handles his personal finances. Message

526 may also explain that Nicole will be providing the participant with the information needed to access an online securities trading account which supposedly shows how Larry invested the money from the heist.

Online voice mail message 526 may be conveyed to the participant in similar fashion as described in connection with the first embodiment, i.e., audio may play where sound card capability exists, but a textual message may also be provided. The voice which is heard on message 526 may also give some insight into the character. For example, Nicole's voice may sound sexy. And for purposes of present discussion, unbeknownst to the participant, Nicole very is beautiful and is hoping to become a model, and is only working for Larry while she tries to get discovered. Nicole has also developed a crush on the participant apparently based on Larry's description of the participant. These circumstances will become known and also pertinent later on in the story line.

When the participant opens voice mail 526, a signal is preferably sent to system manager 2 so that it becomes aware of this and thus knows to send the next message (or messages). For example, e-mail 528 may be from Nicole and may be sent a certain time after Nicole's voice mail 526 was opened. Alternatively, the opening of online voice mail may not spawn any further communications. Instead, the next communications, i.e., e-mail 528 from Nicole and e-mail 532 from Sally, may be spawned from the participant's opening of Sally's e-mail 522.

In any event, Nicole's e-mail 528 may contain the ID and password for another web site 530 that looks like a real-life online trading web site. Several pages 530a, 530b, 530c of web site 530 comprise FIGS. 16a, 16b and 16c, and as shown, the realistic look of the web site 530 enhances the quality and realism of the story line. And as with online newspaper web site 520, it can be seen how the web sites of this embodiment are intended to be more life-like rather than appearing to be specifically set up to tell a portion of the story line, e.g., the web sites of the FIGS. 9d and 12c of the first embodiment. The participant logs onto web site 530 on the home page 530a shown in FIG. 16a by using the information supplied from Nicole's e-mail 528. If the participant attempted to click on any of the icons appearing on the home page, a screen 530b in the form of FIG. 16b comes up which reiterates that the participant must log on.

After the participant successfully logs on, a signal is sent to the host so that the participant's location in the story line is tracked and so that the timing of later communications may be determined. The participant may then view the securities portfolio that was described by Nicole's earlier messages 526, 528. A sample portfolio 530c is shown in FIG. 16c, and as can be seen, real-life, real-time information on actual, existing companies may be inserted into the portfolio thereby enhancing the realistic nature of the story line. And for purposes of the story line, one can see that Larry's wise investments have added up to a lot of money.

As mentioned above, the participant's opening of e-mail 522 may have spawned a third message, i.e., e-mail 532 from Sally, the black widow. In e-mail 532, Sally conveys here belief that Larry is happier in these dying days because he has opened up communication with the participant. Accordingly, the black widow says that she has changed her mind (from what she said in e-mail 522) and requests that the participant continue communication with Larry. However, Sally's e-mail 532 concludes by asking that the participant not do anything with the money just yet.

By the participant's opening of web site 530 with Larry's securities portfolio, system manager 2 is made aware that another message should be sent. This next message is e-mail 534 from Larry in which he states "I did pretty good with the investments, eh?" The realistic timing of subsequent messages is thus shown because it makes sense that Larry not send e-mail 534 until the participant looked at the stock portfolio.

Based on the participant's opening of earlier messages, e.g., Sally's e-mail 532 in FIG. 13, the host is also prompted to send subsequent e-mail 538 from Nicole. It states: "I have to come clean and admit that I looked you up and came to see who you were today. I just wanted to make sure you were a good person. You didn't see me but I liked what I saw. Attached is a picture of me—do you recognize me?Please let me know with either a 'yes' or 'no'."

Just as in real life, e-mail 538 may have a document 540 attached to it that the participant may open by clicking on it. The document can be a realistic head shot or other modeling type of picture that are typically used by models when searching for work. Alternatively, the attachment 540 can be a video which shows Nicole appearing in a music video. Either way, the participant is made aware of Nicole's beauty which may affect how the participant interfaces with the story line in the future.

Based on the participant's response to Nicole's question in e-mail 538, different messages may be sent to the participant. If the participant responded "yes", Nicole's next message may be e-mail 542, and if the response was "no", the next message could be e-mail 544. The story line can thus turn according to whether the participant likes Nicole's appearance. If the participant does, Nicole's e-mail 542 can convey her support for the character which could be useful later on, e.g., Nicole helps the participant. If the participant does not like Nicole due to her appearance or any other reason, Nicole's e-mail 544 can simply say "sorry you don't like me", but unbeknownst to the participant, the rejection of the negative response can lead to Nicole being in cahoots with Sally, the black widow.

Referring back to e-mail 534 from Larry, when this e-mail is opened, system manager 2 receives a signal to send another message. This may be another online voice mail 546 from Nicole stating that a Swiss bank account is being set up in the participant's name to receive the participant's share of the money from securities account 530. The voice mail may also state that Nicole will be sending another message with the ID and password to access the Swiss bank account. A web page may then be presented which represents the Swiss bank account. As with web sites 520, 530, this web site may also look like real-life, online account information rather than a web site specifically created to tell part of the story line. On the other hand, if the timing of the messages has worked out such that Nicole will be in cahoots with Sally, voice mail 546 might convey some other information reflecting a plot twist in the story line.

At this point, the end of FIG. 13 has been reached. However, the current invention contemplates that the story line continues whereby the participant is asked to make further responses which can affect how the story line proceeds. Furthermore, additional characters may be introduced into the story line who may affect how the story line proceeds. Still further, additional web sites and other communications are visited by the participant.

As with the first embodiment, it is contemplated that the story line eventually come to some form of final or interim conclusion. In the story line described above, this could involve the participant running off with the money and Nicole. Alternatively, it could mean the participant being captured by the police and sent to prison (or captured by the crime ring and killed).

Now that this alternative embodiment has been described in connection with a sample story line, the general timing of messages and the possible paths that a story line may follow are discussed in more detail with reference to FIG. 17, and also FIG. 1. The following discussion is not intended to match up with the communications described in connection with the sample story line, but instead provide more detail on the spawning of subsequent messages so that the story line proceeds.

As shown, the story line may be initiated by system manager 2 sending e-mail 600 to the participant which may require no response or action. When the participant opens e-mail 600 to review it, a signal is transmitted to advise system manager 2 that the participant has opened the e-mail. The timer/clock 7 may note when this occurs. This signal may also start a wait time X after which two more messages, e-mail 602 and e-mail 604, are sent to the participant. The length of wait time X may be programmed and may be initiated and measured by timer 7 so that system manager 2 sends e-mails 602, 604 at a time that fits into the story line. For example, if e-mail 600 were e-mail 534 in FIG. 13, wait time X could be a long enough time to allow the participant to check the online voice mail 530. Additionally, e-mail 602 may be sent after wait time X and e-mail 604 may be sent after some other wait time.

E-mail 602 may require one of several responses A, B or C by the participant. Choices A, B and C may be represented by hyperlinks contained in e-mail 602 as discussed in connection with the first embodiment. Alternatively, choices A, B and C may be represented by responses that the participant may need to type in, e.g., "yes", "no" or some other response as discussed in connection with the second embodiment. When the participant decides on his or her response by clicking on the appropriate link or typing in the desired response, server 3 reads the response and then sends the next message. The next message preferably takes the story line down a path that reflects that response. As shown, response C results in the server sending out e-mail 606 while responses A and B may lead to other messages (not shown) that in turn lead the story line down other paths (not shown).

In addition to the server reading responses that result from the participant clicking a hyperlink or typing in "yes" or "no", server 3 may preferably read other types of responses and send out appropriate subsequent messages. For example, host server 3 is preferably programmed to read other textual messages entered by the participant such as a character's name in response to a question inquiring which character the participant wants to do something with. Also, it is preferred that server 3 can recognize textual message from the participant that approximate more easily recognized messages, or that contain certain words. For example, server 3 preferably recognizes "I believe so" as a "yes" and proceeds down the proper story line branch. In addition, it is preferred that server 3 may understand full or otherwise more complicated messages through use of artificial intelligence (AI).

However, it should be noted that any limitation on what types of responses that are recognizable by server 3 may be worked into the story line. Consider the following example in the story line involving Larry and where server 3 may only recognize one-word responses such as "yes" or "no". Larry's message to the participant can request that he or she answer only with a "yes" or "no" after explaining that Larry wants to maintain as much security as possible and thus does not want the participant to provide more information in case this information is intercepted.

Referring again to FIG. 17, e-mail 606 that was spawned by the participant choosing response C, may include an attachment such as a picture or video clip, e.g., a picture of the model Nicole. The attachment may alternatively comprise an ID and password to a lifelike web site such as the newspaper or securities account as also shown in FIGS. 15 and 16.

Referring back to e-mail 604, which was the second message spawned by the participant's opening of e-mail 600, the participant is required to make a "yes" or "no" response. This response may be made by a return e-mail or by the participant clicking on a "yes" link or a "no" link contained in e-mail 604. A "yes" response is read by server 3 and spawns e-mail 608. E-mail 608 may include an attachment such as a picture, video clip or web site link. A "no" response to e-mail 604 is read by server 3 and spawns e-mail 610.

Referring again to e-mail 604, when it is opened by the participant, a signal is sent to server 3, the timing of which may be noted by timer/clock 7 and which may then start the clock running in timer 7 for wait time Y. When timer 7 indicates the appropriate time has elapsed, voice mail 612 may be sent. Thus the opening of e-mail 604 prompts the participant for a response and also spawns another separate voice mail message 612. Voice mail 612 may be sent regardless of whether the participant provided the "yes" or "no" response to e-mail 604. As shown, voice mail 612 need not require any response or action by the participant. But by the participant's reviewing the voice mail, e-mail 614 is spawned.

Referring now to e-mails 606, 608, it is shown how both these e-mails must be opened for voice mail 616 to be spawned. Accordingly, unless the participant chose response C to e-mail 602 and also responded "yes" to e-mail 604, thereby spawning both e-mails 606, 608 in the first place, a path for the story line that involves voice mail 616 will not occur. This displays the interactive nature of the current invention in that the story line is affected by the decisions made by the participant. Accordingly, different participants may encounter different scenarios within the same general story line. To this end, a participant might like the story line so much that he or she participates again but by making different decisions and thereby receiving different results.

Moving forward in the story line, it is shown that voice mail 616 requires one of possible responses A, B, C or D. When one of these responses has been chosen by clicking on an A, B, C or D hyperlink, or providing the response in a textual or other manner, a message corresponding to that response will be spawned. The story line may then continue (not shown) in the same general manner.

Referring now to e-mail 610 which was spawned by a "no" response to e-mail 604, it can be seen that e-mail 610 requires some type of action by the participant, i.e., provide a response, visit a web site, etc. The action is read by server 3 thereby spawning voice mail 618. Though not indicated in FIG. 17, voice mail 618 may be spawned after some amount of waiting time as measured by timer 7 and programmed by system manager 2. The participant then provides either a "yes" or "no" response and the story line may then continue (not shown) in the same genera manner. The story line path containing voice mail 618 may eventually join up with the path containing voice mail 616. In other words, various scenarios may play out but lead to the same interim or final conclusion. Alternatively, the story line path emanating from voice mail 618 may lead to an entirely different conclusion than the path emanating from voice mail 616.

Referring again now to e-mail 614, it is shown how an answer from the participant is required to spawn the next message, voice mail 620. As mentioned above, voice mail 620 may be spawned immediately after the response to e-mail 614 is read by server 3, or it may be delayed by some amount of wait time as measured by timer 7. As shown, voice mail 620 requires an answer to spawn the next message. After this answer is provided, the story line may then continue (not shown) in the same general manner. This story line path may hook up with the paths emanating from voice mail 616 and/or voice mail 618, or it may end up producing an entirely different conclusion.

Figure 17:
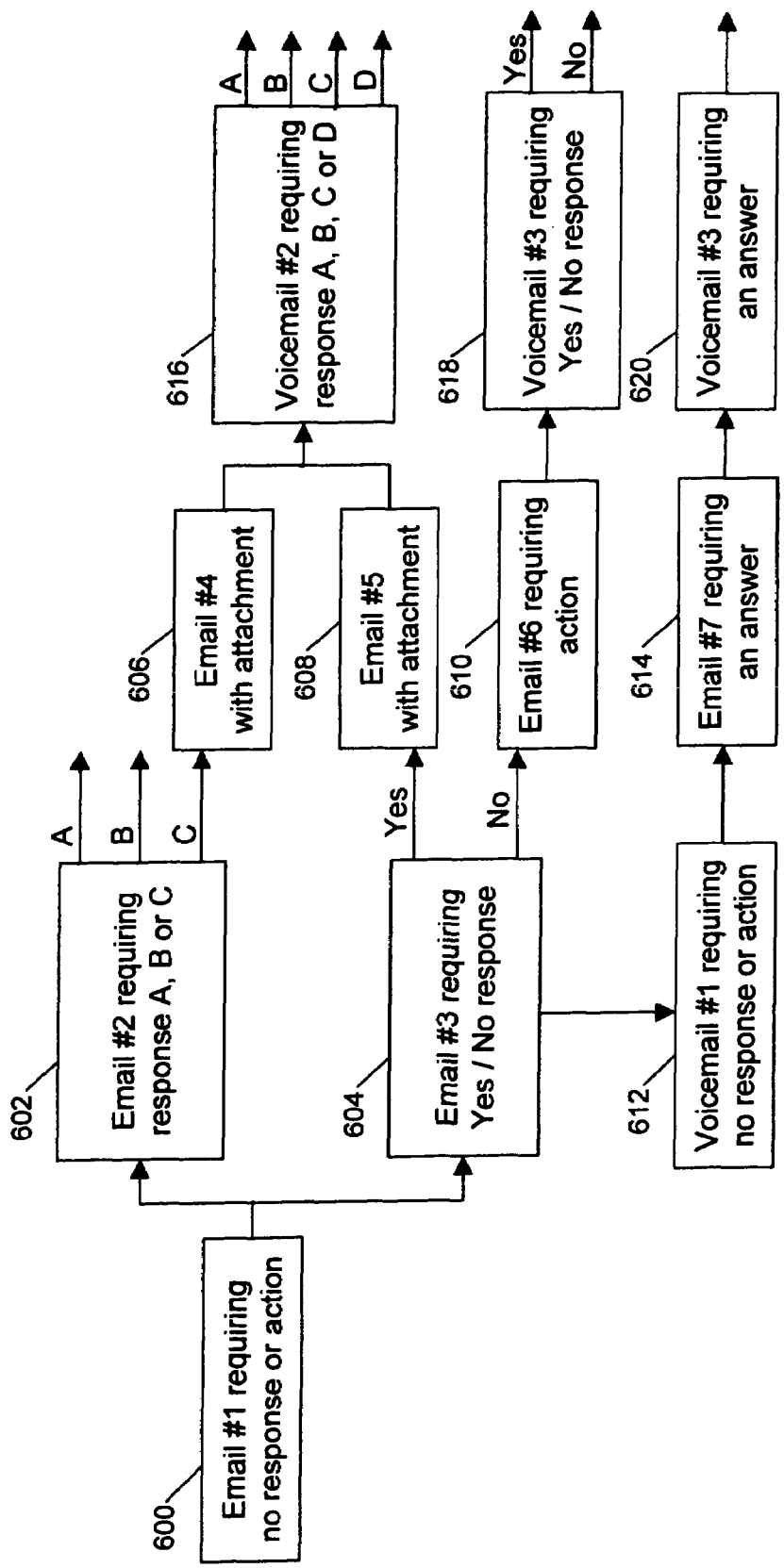
FIG. 17 is a flowchart showing how a story line proceeds by using e-mail, voice mail, web pages and other media according to another embodiment.

The discussion with reference to FIG. 17 generally applies to both the first and second embodiment discussed above. It should be noted that a third embodiment of the current invention may also be used which combines aspects of the first two embodiments. For example, the textual web pages that are specifically created to tell the story line might still be used in connection with the lifelike web sites described in the second embodiment. In any event, the spawning of subsequent messages as discussed in connection with FIG. 17 may be used for any of these embodiment.

Other embodiments are also contemplated by the current invention. For example, another embodiment may involve multiple participants to participate in the same story-line as different characters simultaneously. In this manner, the progress and outcome of the story line may be affected by more than one participant's decisions thereby making the story line more dynamic and interactive. And as shown in FIG. 1, message and other communications between the participants 6 may be used.

Another embodiment may involve a television show that is developed to include the participant's character in the story line. Here, a television show may be associated with system manager 2. The participant may watch the television show and be prompted to convey decisions and messages to system manager 2 at certain times in the show. System manager 2 may then read those decisions and the television show will then progress according to those decisions. In this embodiment, an array of scenes may be filmed before the show occurs whereby the characters involved in the show act out various situations, one for each possible decision to be made by the participant. When the show occurs, decisions will be made and the show can instantaneously proceed with the proper pre-filmed scenario being shown. This creates an interactive television show intimately involving the participant. An additional embodiment that involves a television show is as follows. The experience may take place in the week between the television episodes with each later television episode being dependent on the participant's interaction during the week.

Referring now to FIGS. 18-29, the operation and interaction of system manager 2, server 3, web site 8*a* and the operation of the software of system 1 are now more fully described. Though certain types of software are described below, the current invention is not limited to these specific types of software.

In a preferred embodiment, software is used to advance the overall progress of the story line by interfacing with the participants and various information that may be stored on server 3 and that may reflect the possible twists and turns that the story line may take. More specifically, the software interfaces with the participant's handling of the messages sent by server 3, and the information reflecting the story line contained in various databases (generally referred to as "story line information"). Story line information may be contained in appropriate fields of appropriate tables in the databases. The "participant's handling of messages" generally includes, but is not limited to, the participant's receipt of a message, the participant's opening or review of a message and/or the participant's response to a message.

Upon the participant's handling of a message, the software may be triggered to access the story line information in the appropriate field and database. The software may also be triggered by events other than those associated with the participant's handing of the message. For example, if a first message is sent, the software may be triggered to access an appropriate database after a certain amount of time to send another message regardless of whether the participant did anything with the first message. In any event, once the appropriate story line information has been obtained from the appropriate database and the next decision or story line segment has been determined, the software may then present this next decision or story line segment to the participant. This occurs in an iterative fashion, thereby advancing the story line.

The server 3 and its associated components and databases are now more fully described. Server 3 may include a main processor (CPU) 8 (as shown in FIG. 1), story line software (backend software), various databases and calendar/clock 7. A suitable input/output device may also be included in, or associated with, server 3.

The main processor may comprise any commercially available central processing unit. Story line software may generally refer to the backend software, i.e., that software which advances the story line as discussed above. The databases on server 3 may include e-mail database that may store all the e-mail messages that may be sent to a participant over the course of a story line. A player name/info database may store participant names and other background information that the participant may provide when signing up with system manager 2. A player story-line position database may store information reflecting a participant's position within a story line.

Various web pages that generally refer to the web pages that may convey the results of participant decisions may also reside on server 3. These may include the simulated web pages such as the newspaper or securities account discussed above or other web pages that may be used in the story line. Calendar/clock 7 may keep track of the times that messages are sent or reviewed as well as the timing of other events in the story line. It should be noted that some or all of the databases and software may reside on more than one server or other similar device.

As shown in FIG. 1, server 3 may communicate with participants 6 through various media such as Internet-based media like e-mail, voicemail, video, audio or other media. The World Wide Web may also be used as may Internet (or other similar means), telephony or fax or the mail.

The software file hierarchy of server 3 is now described. Generally, server 3 may include a root directory. This may comprise a "DBFiles" subdirectory and a "DBMFiles" subdirectory. The DBFiles subdirectory may include databases that may be denoted as "DTPDATA.MDB". The DBMFiles subdirectory may generally comprise Cold Fusion scripts or other programming language software scripts or other applicable software. For example, C, $C^+$, $C^{++}$, Java or Microsoft Active Server Pages (ASP) may be used.

Within this subdirectory may be an "attachments" subdirectory that includes the e-mail attachments that may comprise text, pictures, audio, video or other media through which the story line will be conveyed. The DBMFiles subdirectory may also include a "messages" subdirectory that includes e-mail messages, voice mail messages, video mail messages and any other type of message involved in the story line. The DBMFiles subdirectory may also include a "webpages" subdirectory that includes all ancillary story line web pages, e.g., the web pages that describe the outcomes of decisions, or the simulated web pages such as the securities portfolio.

The story line software (backend) is now more fully described. In a preferred embodiment, the story line software may operate on a Microsoft® NT IIS server platform utilizing Cold Fusion™ application software and Microsoft® Access 2000 databases. Other software may be used such as C, C+, C++, Java and Microsoft Active Server Pages (ASP). Other types of databases may also be used such as Microsoft SQL Server databases. Generally, software scripts may be triggered to access story line information based on the participant's handling of messages sent by server 3. It should be noted that although repeated reference is made to Cold Fusion™ herein, other suitable software may be used. Accordingly, the current invention is not limited to the use of Cold Fusion™ software.

Triggering events may include the following: participant logs into e-mail account (account provided by host web site 8a (FIG. 1) or comprises a mock e-mail account), participant reads an e-mail message, participant responds to an e-mail that solicited a response, participant's response is recorded, the participant views an e-mail attachment, participant listens to an online voice mail message, participant views an online video clip and participant logs onto and views an ancillary story line web site.

As mentioned above, the story line software may operate and may be triggered by events other than those listed above and which may not involve affirmative steps taken by the participant. For example, the story line software may be triggered when a certain amount of time has elapsed since a message was sent. Furthermore, the current invention is not limited to the use of messages embodying e-mails and web sites as set forth in the above list of events. Instead, other media may be used and other events may occur when the participant handles messages embodying such other media.

It is preferred that each time a triggering event occurs, various individual software scripts are triggered to record the specifics of the event including the type event and the time of the event. The scripts update various fields in various tables in the main database to reflect this information. In this manner, the story line software may keep track of what a participant does and when.

It is preferred that the story line software be embedded with commands that may be used to perform database queries. In a preferred embodiment, the story line software may be embedded with Standard Query Language ("SQL") or other data base query language commands. The story line software is preferably tagged with commands, e.g., HTML or other type of code that activate the SQL or other database queries. The databases contained on server 3 are preferably designed to understand the SQL or other commands embedded in the story line software. To this end, the tags embedded in the software may serve as an interface to the databases when a triggering event occurs. In this manner, the software assesses the data in the fields of the databases, obtains the appropriate story line information from the appropriate field, updates the information contained in the field(s) and thereby advances the story line.

The databases of the current invention are now more fully described with reference to FIGS. 18-25. As shown in FIG. 19, server 3 may include a main database 1000 (denoted dtpdata.mdb) that in turn may include various tables that may in turn include various fields. Main database 100 may include mailboxes table 1002, messages table 1004, positions table 1006, replies table 1008, users table 1010, web pages table 1012 and web messages table 1014. Additional tables may be included for other forms of media and communication, and for other functions.

Mailboxes table 1002 is shown in FIG. 20. It may generally contain the messages of each user and the message status. To this end, mailboxes table 1002 may include mailID field 1002a which may serve as the primary key for this table and for unique identification of mail. Field 1002b may be userID and may serve as a unique participant identification number. Field 1002c may be msgID and may serve as a unique message identification number. Field 1002d may be msgsubj and may reflect the message's subject. Field 1002e may be msgsender and may reflect the message's sender. Field 1002f may be msgtime and may reflect the time when a participant received a message. Field 1002g may be read and may indicate whether the participant has reviewed the message. Field 1002h may be read time and may indicate the time when a participant read the message. Sample information is shown in mailboxes table 1002, but it will be recognized that other information may be contained therein.

Messages table 1004 is shown in FIG. 21. It may include the messages of the story line and the characteristics of the messages. The actual bodies of the message may be stored in a subfolder such as a subfolder entitled "messages". Some of the fields may be duplicative of field in the foregoing mailboxes table 1002, and other field discussed below. Accordingly, the field of various tables may be updated accordingly.

Messages table 1004 may include msgID field 1004a which may serve as a primary key for this table for unique identification of messages. Field 1004b may be wait that may be the wait time before the message is displayed after an event has occurred. An example of such an event may be that a participant reads another message, a participant replies to another message, or that a participant logs onto a web page. Field 1004c may be voice which indicates whether the message is a voice message. Field 1004d may be msgsubj which may reflect the subject of the message. Field 1004e may be msgsender which may reflect the sender of the message. Field 1004f may be attachments which reflects the path and filename of the eventual attachments.

Field 1004g may be NextposO and may be the default next position, e.g., when a participant does not need to reply. Field 1004h may be replynos which may be the number of accepted replies stored in the database. Fields 1004ikm may be nextposX which may be the next position when the participant replies with reply number X. Fields 1004jln may be the participant's reply number X. Field 1004o may be noreplypos which may be the next position when a participant does not reply within an allotted time. Field 1004p may be noreplytime which may be the allotted time that a participant should reply within.

Figure 22:
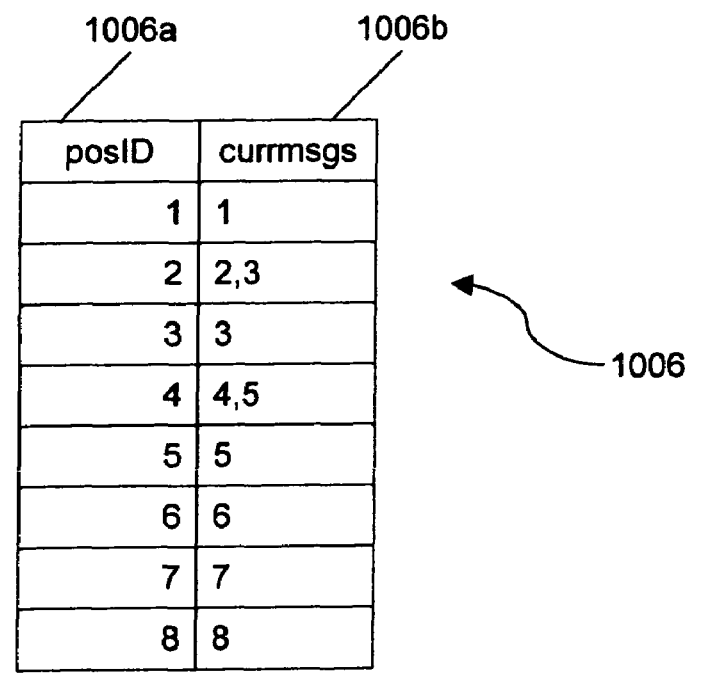

Positions table 1006 is shown in FIG. 22 and may link current positions with current messages. It may include field 1006a which may be posID that may be the primary key for this table for unique identification of positions. Field 1006b may be currmsgs which may be a comma separated list of mesgIDs that belong to the current position. The first currmsgs listed may be the primary message that will determine the participant's next position, while the others list may be secondary.

Replies table 1008 is shown in FIG. 23 and may show the body and other information of participant's replies to messages. As shown, this table may include field 1008a which may be reply ID that serves as the primary key for this table for unique identification of replies. Field 1008b may be userID that may reflect a unique participant identification number. Field 1008c may be msgID that reflects a unique message identification number. Field 1008d may be replytime that may reflect the time when the participant sent the reply. Field 1008e may be msgbody that contains the body of the participant's reply.

Users table 1010 may contain various information about the participant and is shown in FIG. 24. It may include field 1010a which may be userID and which may serve as the primary key for this table for unique identification of participants. Field 1010b may be username and contain the log in name for the participant. Field 1010c may be lastname and may contain the last name of the participant. Field 1010d may be firstname and may contain the participant's first name. Field 1010e may be password and may contain a password for the participant. Field 1010f may be position and may reflect the current position of the participant in the story line. Field 1010g may be logtime and may reflect the time when the participant last logged on. Field 1010h may be middlename and may be the participant's middle name. Field 1010i may be birthday and may be the participant's birthday. Field 1010j may be address and may be the participant's street address. Field 1010k may be city and may be the city in which the participant lives. Field 1010l may be state and may be the state in which the participant lives. Field 1010m may be region and may be the region in which the participant lives. Field 1010n may be zipcode and may be the zip code in which the participant lives. Field 1010o may be homephone and may be the home telephone number of the participant. Field 1010p may be email and may be the e-mail address of the participant.

Web pages table 1012 is shown in FIG. 25 and may contain information on how the system may react when the participant accesses certain web pages. Field 1012a may be pageID which may serve as a primary key for this table for unique identification of web pages. Field 1012b may be pagename which may reflect the name of a web page. This field may just facilitate the ease of reading. Field 1012c may be wait which may reflect the wait time (in minutes or other increment) before the participant position is updated. Field 1012d may be nextpos which may reflect the position to which the user is directed in the story line after accessing the web page. Field 1012f may be req_webmsgs and may be the required messages that the participant must have accessed prior to being allowed access to the web page. Field 1012g may be url and may be the web address of the web page. Field 1012h may be nexturl and may be the next web address that the participant is directed to once he has accessed the original web page. Field 1012i may be failurl and may be the web address the participant is directed to if he does not access the original web page correctly, for example, he enters the incorrect username and/or password.

Figure 18:
FIG. 18 shows a web messages table.
Figure 19:
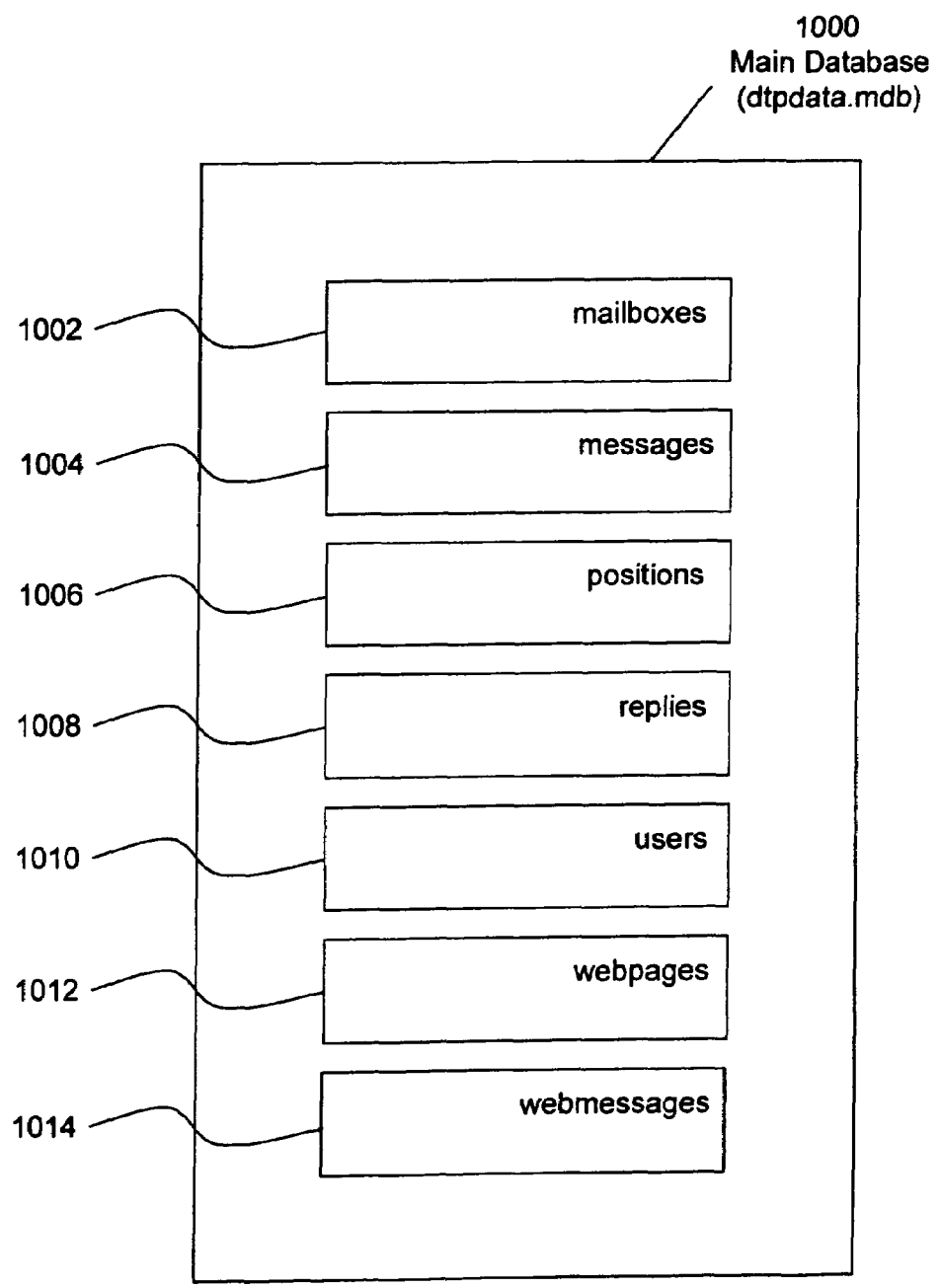
FIG. 19 shows a main database.

Web messages table 1014 is shown in FIG. 18 and may contain information regarding whether a participant's position was updated after the participant access a particular web page. Field 1014a may be webmsgID and may be the web message ID and may serve as a primary key for this table for unique identification of web messages. Field 1014b may be userID and may be the user's ID. Field 1014c may be msgID and may be the message ID that the user last accessed before viewing the particular web page. Field 1014d may be used and may show whether or not this message was used to update the user's position. This ensures that the user's position is only updated upon the first time the user accesses a web page and not upon any future accessing of the same web page.

The foregoing tables may also include fields other than those described above. In any event, the fields and tables generally interfaces with scripts, such as the software scripts mentioned above. Each time an event occurs, individual scripts are triggered to record the specifics of the event including the type of event and the time of the event. The scripts update the fields in various tables in the main database 1000 to reflect this information. In this manner, server 3 generally monitors the participant's decisions and the timing thereof, as well as the participant's progress in the story line.

Reference is now made to FIG. 26 which describes the scripts, e.g., Cold Fusion or other software scripts, that may interact with the foregoing fields. The function of each script and other comments are also provided.

As shown, the script denoted application.cfm 1102 may initialize certain variables for the story line software. The script denoted authentifail,cfm 1104 may provide a warning message when a participant's authentication fails. The script denoted delete.cfm 1106 may delete messages out of a participant's mailbox. The script denoted mailserver.cfm 1108 may distribute messages to participant. This script is preferably called or periodically triggered to check on the status of each participant and may deliver messages to participants when appropriate.

The script denoted msgretrieve.cfm 1110 may display the mailbox of a participant. The script denoted posretrieve.cfm may retrieve the next position for a participant. The script denoted reply.cfm 1114 may create an input form for a participant to reply to a message. The script denoted sendreply.cfm 1116 may handle a participant's reply. This script may retrieve the next position and store the reply in the main database 1000. The script denoted showmsg.cfm 1118 displays messages in text as well as voice mail. The web page denoted start.htm 1120 may serve as a log in page for a participant.

The operation of backend story line software through the use of scripts which interact with the information contained in the various fields of the tables in database 1000 is now more fully discussed. Generally, the backend story line software begins operating when a participant logs on with system manager 2. At this point, the start.htm web page 1120 may serve as a log in page for the participant. At this time, the mailserver.cfm script 1108 may also be started to check on the status of the participant, and here, mailserver.cfm 1108 will show that the participant is only logging on. All other scripts may be initiated from within the software application.

As the story line progresses, events such as those described above will occur. When an event occurs, the posretrieve.cfm script 1112 may determine the next position the participant will move to depending on the event. For example, if the event was the viewing of or listening to a message sent by server 3, posretrieve.cfm 1112 may check the messages table 1004 for the next position. If the event was the replying to a message, sendreply.cfm script 1116 may record the reply in the replies table 1008 and check the messages table 1004 for the next position depending on the participant's reply. If the event was the viewing of a web page, the web pages table 1012 may be checked for the participant's next position.

It is preferred that the "mailserver.cfm" script 1108 runs periodically, e.g., every few minutes, to check on the status of each participant. The mailserver.cfm script may also deliver messages when appropriate. This helps ensure that the story line progresses properly by ensuring that participants obtain delivery of their messages from server 3. The mail server may also tell the system manager what actions have been performed.

The mailserver.cfm script 1008 may check each event that has taken place, if any, since this script last ran. Mailserver.cfm 1008 also determines the next series of messages (text, audio, video or other media) that correspond to the participant's new position by checking the positions table 1006.

The mailserver.cfm script 1008 may also check the wait statement for these messages in the messages table 1004. The wait statement may require that a pre-determined amount of time must pass, e.g., waiting times X or Y in FIG. 17, after a specific event before the next specific message is delivered to the participant.

The mailserver.cfm may also compare the time of the last event with the current time and determine if enough time has passed in order to deliver the next message or series of messages. If enough time has passed, this script may deliver the next message or series of messages. If not, it may do nothing until it runs again and makes the same check. If the next event has not occurred again, mailserver.cfm may simply wait until it runs again.

When constructing a story line, there is preferably not a requirement that one needs to deal with the scripts. Instead, it is preferred that a story line may be constructed from within the platform, e.g., MicroSoft Access 2000 or other platform, by changing the tables. Also, the messages may be in an ASCII (windows Notepad) format and may contain valid software programming code, e.g. for user salutation: Hi <CFOUTPUT>#session.user#</CFOUTPUT>. Also in order to achieve a line break in the message, a <BR> tag is preferably used.

Figure 28:
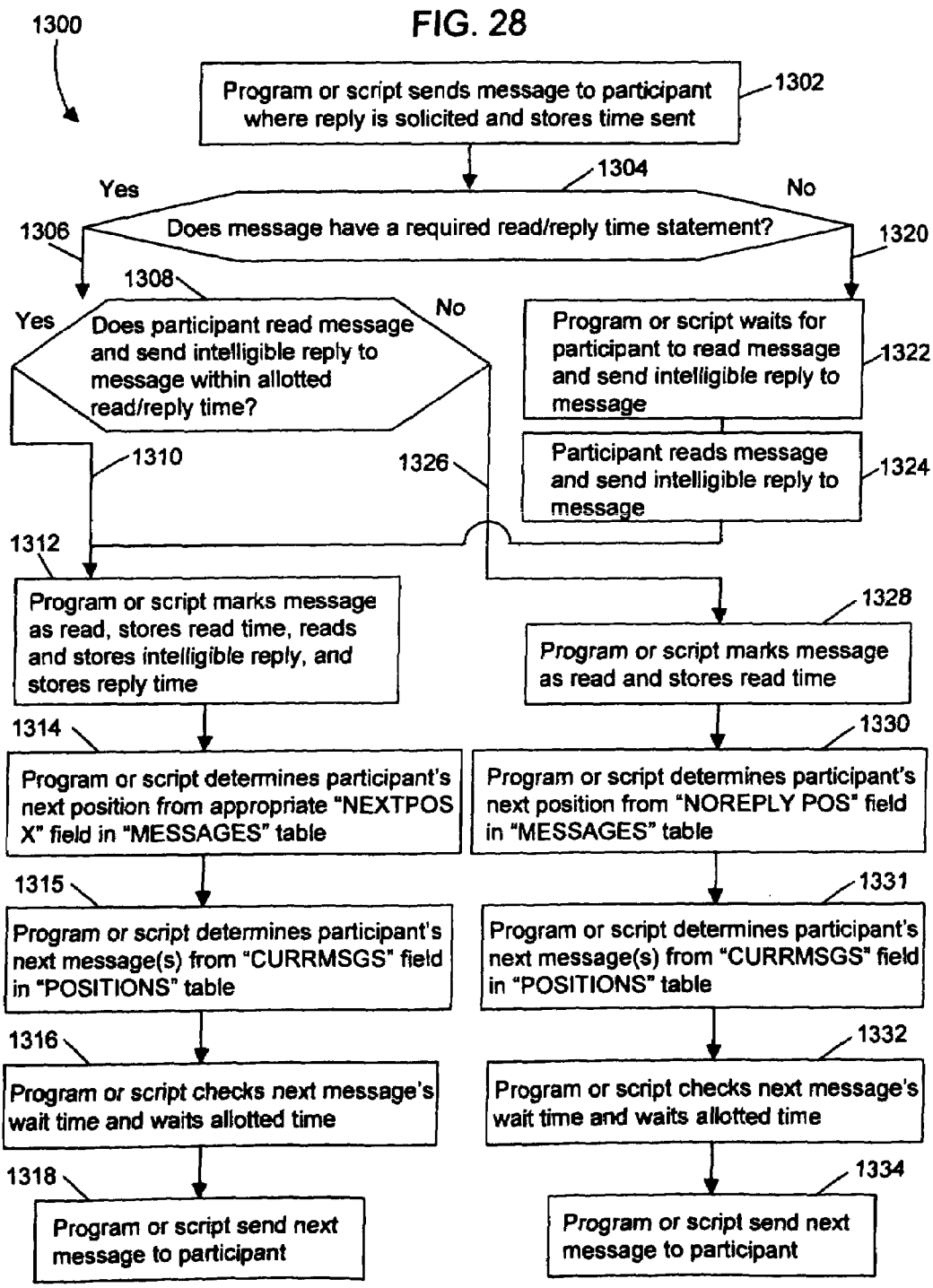
FIG. 28 is a flow chart showing a triggering event whereby the story line software sends a message to a participant where a reply is solicited and the time sent is stored.

With reference to FIGS. 27-29, the use of software scripts, such as Cold Fusion, C, $C^+$, $C^{++}$, Java or Microsoft Active Server Pages (ASP), in connection with triggering events is now discussed. FIG. 27 describes a triggering event 1200 whereby a software script sends a message to a participant and no reply is solicited. In this event, the script may store the time sent. As shown, the script may first send the message to the participant as in step 1202. At this point, the software considers whether the message has a required read time statement as in step 1204. If yes as in step 1206, the software may next consider whether the participant viewed the message within the allotted view time as in step 1208. If yes again as in step 1210, the software script may mark the message as read and may also store the time the message was read as in step 1212.

Thereafter, the software script may determine the participant's next position from the "nextPos" field in the "messages" table as in step 1214. Thereafter, the script may determine the next messages from the "currmsgs" field in the "positions" table as in step 1215. Thereafter, the software script may check the wait time of the next message and wait the allotted time as in step 1216. Thereafter, the software script may send the next message to the participant as in step 1218.

Referring back to step 1204 where the software considers whether the message has a required read time statement, if no as in step 1220, the software script may wait for the participant to read the message as in step 1222. Thereafter the participant may read the message as in step 1224 and the software may proceed as discussed above in connection with steps 1212, 1214, 1216 and 1218.

Referring back to step 1208 where the software considers whether the participant viewed the message within the allotted time, if no as in step 1226 the software script may mark the message as read and may store the read time the message was deemed to have been read as in step 1228. Thereafter, the software script may determine the participant's next position from the "noreplypos" field in the "messages" table as in step 1230. Thereafter, the script may determine the next messages from the "currmsgs" field in the "positions" table as in Step 1231. Thereafter the software script may check the wait time of the next message and wait the allotted time as in step 1232. Thereafter, the software script may send the next message to the participant as in step 1234.

Referring now to FIG. 28, another triggering event 1300 is shown when the software script sends a message to the participant where a reply is solicited and the time sent is stored. As shown, the message may be sent as in step 1302. At this point, the software may consider whether the message has a required read/reply time statement as in step 1304. If yes as in step 1306, the software may then consider whether the participant read the message and sent an intelligible reply to the message within the allotted read/reply time as in step 1308.

If yes as in step 1310, the software script may mark the message as read, may store the read time, may read and store the intelligible reply and may store the reply time as in step 1312. Thereafter, the software script may determine the participant's next position from one of the "nextposX" fields in the "messages" table as in step 1314. Thereafter, the script may determine the next messages from the "currmsgs" field in the "positions" table as in step 1315. Thereafter the software script may check the wait time of the next message and wait the allotted time as in step 1316. Thereafter, the software script may send the next message to the participant as in step 1318.

Referring back to step 1304 where the software considers whether the message had a required read/reply time statement, if no as in step 1320, the software script may wait for the participant to read the message and send an intelligible reply as in step 1322. Upon the participant reading the message and sending an intelligible reply as in step 1324, the software script may proceed as in steps 1312, 1314, 1316 and 1318 when the next message is sent.

Referring back to step 1308 where the software considers whether the participant read the message and sent an intelligible reply within the allotted time, if no as in step 1326, the software script may mark the message as read and may store the read time the message was deemed to have been read as in step 1328. This reflects the situation where the story line will continue even without the participant's having read and/or replied to the message. Thereafter, the software script may determine the participant's next position from the "noreplypos" field in the "messages" table as in step 1330. Thereafter, the script may determine the next messages from the "currmsgs" field in the "positions" table as in step 1331. Thereafter, the software script may check the wait time of the next message and wait the allotted time as in step 1332. Thereafter, the software script may send the next message to the participant as in step 1334.

Referring now to FIG. 29, another triggering event 1400 is described when the software script sends a message to the participant containing web site URL information and stores the time the message was sent. As shown, the message may be sent as in step 1402. The software may then consider whether the web site has a required log on time statement as in step 1404. If yes as in step 1406, the software may consider whether the participant viewed the message and logged on to the web site within the allotted log on time as in step 1408.

If yes as in step 1410, the software script may mark the message as read and may store the time it was read and may mark the web site as viewed as in step 1412. Thereafter, the software script may determine the participant's next position from the "nextpos" field in the "webpages" table as in step 1414. Thereafter, the script may determine the next messages from the "currmsgs" field in the "positions" table as in step 1415 and mark the used field corresponding to the appropriate msgID in the webmessages table as yes to show the user's position has been updated. Thereafter, the software script may check the wait time of the next message and may wait the allotted time as in step 1416. Thereafter the software script may send the next message to the participant as in step 1418.

Referring back to step 1404 where the software considers whether the web site has a required log on time statement, if no as in step 1420, the software script may wait for the participant to log onto the web site as in step 1422. Thereafter, the participant may log onto the web site as in step 1424. Thereafter, the software script may proceed as in steps 1412, 1414, 1416 and 1418 when the next message is sent to the participant.

Referring back to step 1408 where the software considers whether the participant viewed the message and logged onto the web site within the allotted log on time, if no as in step 1426, the software script may mark the message as read, may store the time the message was deemed to have been read and may mark the web site as viewed as in step 1428. Thereafter, the software script may determine the participant's next position from the "noreplypos" field in the "messages" table as in step 1430. Thereafter, the script may determine the next messages from the "currmsgs" field in the "positions" table as in step 1431 and mark the used field corresponding to the appropriate msgID in the webmessages table as yes to show the user's position has been updated. Thereafter the software script may check the wait time of the next message and may wait the allotted time as in step 1432. Thereafter, the software script may send the next message to the participant as in step 1434.

It should be noted that while Cold Fusion or other software scripts are discussed above, the current invention is not limited to this type of software or programming language. Other suitable software or programming language may be used such as C, $C^+$, $C^{++}$, Java and Microsoft Active Server Pages (ASP).

A description on various mechanisms to generate revenue through the current invention is now described. One revenue stream may be based on subscriptions whereby participants pay a nominal fee to participate in each story line. An alternative included in this type revenue stream involves the situation where the story line could be bundled with other products that are currently being bought over the Internet via e-commerce.

As discussed later on in connection with the novel income-generating methods of the current invention, a fee could be charged to participate in a story line up to a certain outcome. Where the outcome is interim, another fee could be charged to participate in the next segment of the story. If the outcome is final, another fee could be charged to participate in another story line.

Another revenue stream may involve paid advertisements by manufacturers of products or services that would pay to have their products and logos featured in the story line, either visually or audio-based. As discussed above, an example would be a resort destination that itself becomes part of the story line. To this end, an entire story line (or portions thereof) could revolve around a certain company's products or services. Furthermore, certain story lines would appeal to certain demographics such that entities could choose to advertise their products or services in certain story lines. Furthermore, advertisements could appear on the participant's home page game browser.

In addition to character and decision web pages, the story line may involve "location" web pages as shown in FIG. 12 which the participant may be asked to visit. Such location web pages may comprise pictures of the surrounding area in which the story line is occurring. To this end, the current invention provides a manner in which companies may advertise their goods or services. For example, if the story line is to occur on a resort island, the location web pages may comprise pictures and/or video footage of the resort.

As another example of advertising, current movie production houses typically create web sites for promoting a forthcoming movie. With the current invention, a story line could be generated that relates to the movie. For example, the story line could lead the participant up to the point where the movie actually starts, giving the participant background of the movie. To this end, the story line could also introduce participants to the various products such as shirts, jackets, hats, etc. that will be offered with the movie's name on it.

Another revenue stream may be licensing based. That is, the game could be licensed to major internet portal sites such as AOL, Netcenter, Disney, MSN etc. These sites could offer various story lines to their customer base as an incentive or promotion. To this end, participants could have to log-on to the story line through the host site thus increasing traffic to the site.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. A system wherein a participant interacts with an evolving story line that evolves through firing a series of story line triggers and that includes at least one virtual character, comprising:
    a system manager including memory and a processing unit, the system manager containing information about the firing of story line triggers and about at least one virtual character in the evolving story line, and being connected to at least one form of media and at least one participant;
    a message from a virtual character in the evolving story line sent by the system manager to the participant that conveys information of the story line;
    a timer that;
        defines an amount of time for the participant to open the message after which a story line trigger fires,
        defines an amount of time for the participant to reply to the message after the message has been opened, after which a story line trigger fires,
        defines an amount of time after a story line trigger is fired for a subsequent message from the same or a different virtual character to be sent to the participant;
    wherein at least some story line triggers are fired based on a participant opening a message or on a response received by the system manager from the participant and wherein the story line evolves based on the firing of story line triggers.

2. The system of claim 1 wherein the message is an e-mail.

3. The system of claim 1 wherein the message includes a hyperlink that reflects a possible response by the participant.

4. The system of claim 3 wherein the participant is directed to the web page by clicking on the hyperlink.

5. A system for providing an interactive story line that evolves through firing a series of story line triggers and having a plurality of routes, wherein a participant assumes the role of a character in the story line, interacts with one or more virtual characters that are part of the story line and affects the progress of the story line, the system comprising:
a system manager that stores information about the about story line, including information about the firing of story line triggers and about the one or more virtual characters;
a message from a virtual character sent by the system manager to the participant that seeks a response by the participant; and
a timer that;
defines an amount of time for the participant to open the message after which a story line trigger fires,
defines an amount of time for the participant to reply to the message after the message has been opened, after which a story line trigger fires,
defines an amount of time after a story line trigger is fired for a subsequent message from the same or a different virtual character to be sent to the participant;
wherein at least some story line triggers are fired based on a participant opening a message or on a response received by the system manager from the participant and wherein the story line evolves based on the firing of story line triggers.

6. The system of claim 5, further comprising:
a subsequent message from the same or a different virtual character sent by the system manager to the participant that has content depending on the participant's response and that seeks a subsequent response by the participant; and
wherein the system manager further progresses the story line along a route based on the participant's subsequent response.

7. The system of claim 6, further comprising:
additional subsequent messages from the one or more virtual characters sent by the system manager to the participant that have content depending on the participant's prior responses and that seek subsequent responses by the participant; and
wherein the system manager further progresses the story line along a route to the story line's interim or final conclusion based on the participant's additional subsequent responses.

8. The system of claim 5, wherein the message is in the form of an e-mail, video mail, voice mail, instant message, fax or phone message.

9. The system of claim 5, wherein the message is in the form of an e-mail containing a hyperlink to a web page, and the participant visits the web page to obtain information about the story line.

10. The system of claim 9, wherein the web page includes a textual, video, graphical or audio description of another character in the story line.

11. The system of claim 9, wherein the web page contains information regarding actual events occurring in reality and fictional information that describes the story line.

12. The system of claim 5, wherein the message is personalized by indicating the participant's real-life name or the participant's real-life address.

13. The system of claim 5, wherein the system administrator includes a server.

14. The system of claim 5, wherein the message and response between the system manager and participant are exchanged over the Internet.

15. The system of claim 5, wherein the message and response between the system manager and participant are exchanged using wireless communication.

16. The system of claim 5 wherein the story line is educational, erotic, historical or involves espionage.

17. The system of claim 5 wherein the role of the character in the story line assumed by the participant is the participant's real-life identity.

18. A method for providing an interactive story line that progresses through firing a series of story line triggers and having a plurality of routes and one or more virtual characters, wherein a participant assumes the role of a character in the story line, interacts with one or more virtual characters in the story line and affects the progress of the story line, the method comprising:
storing information about the story line, including information about the firing of story line triggers and about one or more virtual characters;
sending a message from a virtual character to the participant that seeks a response by the participant;
defining an amount of time for the participant to open the message after which a story line trigger fires,
defining an amount of time for the participant to reply to the message after the message has been opened, after which a story line trigger fires,
defining an amount of time after a story line trigger is fired for a subsequent message from the same or a different virtual character to be sent to the participant;
wherein at least some story line triggers are fired based on a participant opening a message or on a response received by the system manager from the participant and wherein the story line is progressed along a route based on the firing of story line triggers.

19. The method of claim 18, further comprising:
sending a subsequent message from the same or a different virtual character to the participant that contains content depending on the participant's response and that seeks a subsequent response by the participant;
receiving a subsequent response by the participant that represents how the participant's character interacts with the content contained in the subsequent message; and
further progressing the story line along a route based on the participant's subsequent response.

20. The method of claim 18, wherein sending the message comprises sending an e-mail, video mail, voice mail, instant message, fax or phone message.

21. The method of claim 18, wherein the message is in the form of an e-mail containing a hyperlink to a web page, and the participant visits the web page to obtain information about the story line.

22. The method of claim 21, wherein the web page includes a textual, video, graphical or audio description of another character in the story line.

23. The method of claim 21, wherein the web page contains information regarding actual events occurring in reality and fictional information that describes the story line.

24. The method of claim 18, wherein the message is personalized by indicating the participant's real-life name or the participant's real-life address.

25. The method of claim 18, wherein the information about the story line is stored on a server.

26. The method of claim 18, wherein the message and response are exchanged over the Internet.

27. The method of claim 18, wherein the message and response are exchanged using wireless communication.

28. The method of claim 18, wherein the story line is educational, erotic, historical or involves espionage.

29. The method of claim 18, wherein the role of the character in the story line assumed by the participant is the participant's real-life identity.

* * * * *